(12) United States Patent
Kai et al.

(10) Patent No.: US 8,777,117 B2
(45) Date of Patent: Jul. 15, 2014

(54) METAL SHEET AND TAG SET

(71) Applicant: Fujitsu Limited, Kawasaki (JP)

(72) Inventors: Manabu Kai, Yokohama (JP); Teruhisa Ninomiya, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/034,700

(22) Filed: Sep. 24, 2013

(65) Prior Publication Data

US 2014/0021265 A1 Jan. 23, 2014

Related U.S. Application Data

(63) Continuation of application No. PCT/JP2011/058798, filed on Apr. 7, 2011.

(51) Int. Cl.
*G06K 19/06* (2006.01)
(52) U.S. Cl.
USPC .......................................................... 235/492
(58) Field of Classification Search
USPC .................... 235/492; 343/795; 340/572.7
See application file for complete search history.

(56) References Cited

U.S. PATENT DOCUMENTS

| 7,323,996 B2 * | 1/2008 | Mullins ...................... 340/572.7 |
| 2006/0208955 A1 * | 9/2006 | Kai et al. ...................... 343/795 |
| 2007/0126586 A1 | 6/2007 | Ohtaka |
| 2007/0182560 A1 | 8/2007 | Mori et al. |
| 2007/0268194 A1 | 11/2007 | Kai et al. |

FOREIGN PATENT DOCUMENTS

| JP | 11-242786 | 9/1999 |
| JP | 2001-160124 | 6/2001 |
| JP | 2006-270813 | 10/2006 |
| JP | 2006-295879 | 10/2006 |
| JP | 2007-156632 | 6/2007 |
| JP | 2007-235926 | 9/2007 |

OTHER PUBLICATIONS

International Search Report, mailed in connection with PCT/JP2011/058798 and mailed Jul. 12, 2011.

* cited by examiner

*Primary Examiner* — Kristy A Haupt
(74) *Attorney, Agent, or Firm* — Fujitsu Patent Center

(57) ABSTRACT

A metal sheet including: a first and second metal sections disposed at point symmetrical positions about a center point of the metal sheet, wherein
each portion of the first and second metal sections is affixed to a tag so as to contact to the tag which performs non-contact communication.

12 Claims, 24 Drawing Sheets

TAG SET 10

TAG SET 10

TAG SET 10

TAG SET 10

TAG SET 10

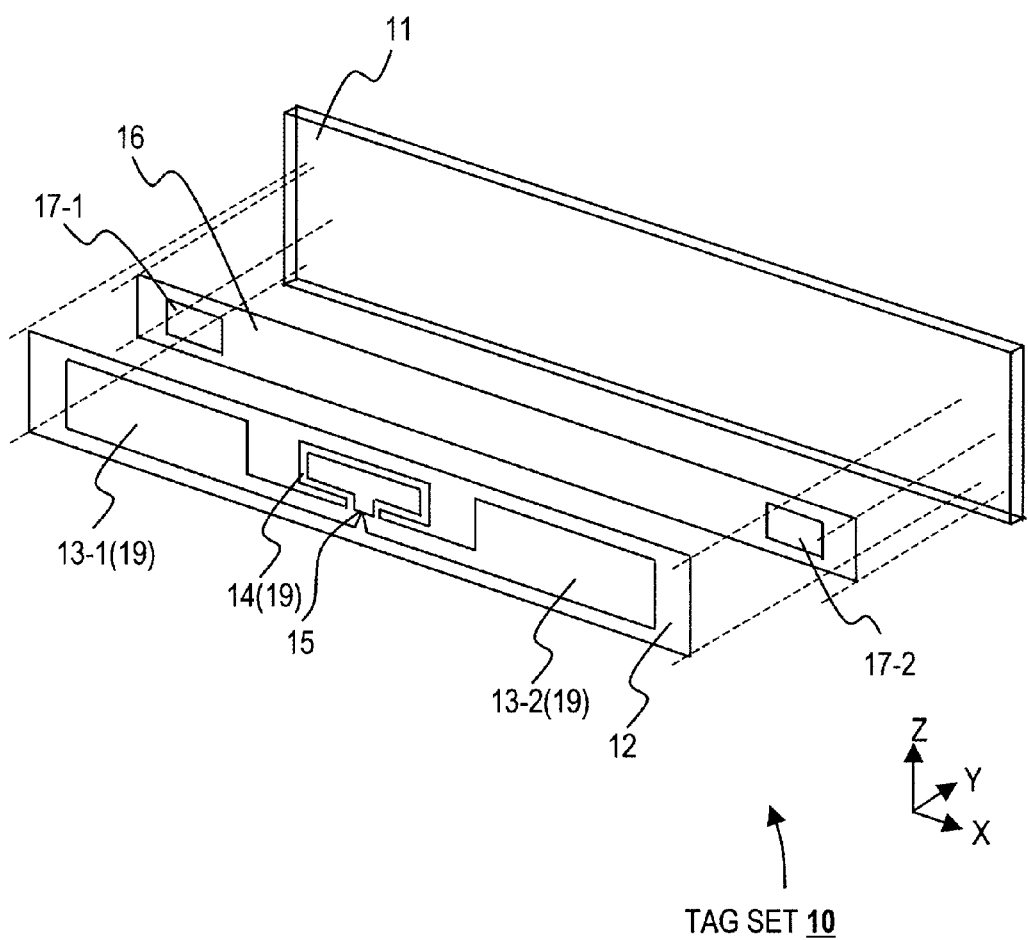

TAG SET 10

TAG SET 10

TAG SET 10

METAL SHEET AND TAG SET

CROSS-REFERENCE TO RELATED APPLICATION

This application is a continuation application of International Application PCT/JP2011/058798 filed on Apr. 7, 2011 and designated the U.S., the entire contents of which are incorporated herein by reference.

FIELD

The embodiments discussed herein are related to a metal sheet and a tag set.

BACKGROUND

In recent years, an RFID (radio frequency identification) system using a radio signal of a UHF band (for example, 860 MHz-960 MHz) attracted attention. In the RFID system, for example, a radio signal of about 1 W is transmitted from a reader/writer, and a tag receives the radio signal and transmits a response signal to the reader/writer, so that the reader/writer reads information stored in the tag. By the storage of information (ID etc.) into the tag affixed on an article such as a corrugated cardboard and a book, such an RFID system is used as a product inventory management system or a book management system in a library.

A tag for use for the RFID system includes a dipole antenna with a length of 100 mm and a width of 15 mm, for example, and a chip (LSI (large scale integration), for example) with a length and a width of 1 mm or less, respectively. The communication distance of the tag with the above sizes is, for example, about 3 to 10 m.

There is a tag intended to have a more compact size. For example, there is a tag in which the length of a dipole antenna is made shorter than $\lambda/2$ (for example, approximately 160 mm relative to a frequency of 953 MHz), and an inductance is formed to enable the dipole antenna to match with a chip. FIG. 22 depicts a diagram illustrating an exemplary configuration of such a tag 100. In the example depicted in FIG. 22, the length of dipole sections 103-1, 103-2 (X-axis direction in FIG. 22) is 73 mm, and the width (Z-axis direction in FIG. 21) is 7 mm. Here, the tag 100 depicted in FIG. 22 includes the dipole sections 103-1, 103-2, an inductance section 104 and a chip 105. Further, a tag antenna 109 includes the dipole sections 103-1, 103-2 and the inductance section 104, for example.

The chip 105 in the RFID may be represented equivalently as a parallel circuit composed of a capacitive component Cc=1.0 pF and a resistive component Rc=1750Ω. Meanwhile, the dipole sections 103-1, 103-2 may be represented equivalently as a parallel circuit composed of a resistor Ra and an inductance La. FIG. 23 depicts a diagram illustrating an example of the equivalent circuit of the tag 100 depicted in FIG. 22. The equivalent circuits of the chip 105 and the dipole sections 103-1, 103-2 are connected in parallel, and the inductance La of the dipole sections 103-1, 103-2 is determined, for example, in a manner to be resonant with the capacitor Cc of the chip 105 (for example, $f0=2\pi/\sqrt{(LaCc)}$). By this, the chip 105 matches with the dipole sections 103-1, 103-2 for example, at a desired frequency f0 (for example, 953 MHz or the like), so that the reception power of the dipole sections 103-1, 103-2 may sufficiently be supplied to the chip 105 side.

As such, the tag 100 is designed in consideration of a matching condition etc., and the tag 100 in the RFID system is used by being affixed to a some dielectric (dielectric constant $\in r$, thickness t (Y-axis direction in FIG. 22)). Therefore, at the design of the tag 100, the sizes of the tag antenna 109 etc. are designed in consideration of the dielectric constant $\in r$ and the thickness t of an affix object.

The tag 100 depicted in FIG. 22 represents an example when the tag 100 is affixed to an affix object 101 (for example, plastics such as a polycarbonate and an ABS resin (acrylonitrile-butadiene-styrene copolymer synthetic resin)) having dielectric constant $\in r=3$ and thickness (Y-axis direction in FIG. 22) t=10 mm.

FIG. 24 is a drawing obtained by executing an electromagnetic field simulation on the tag 100 and plotting on an admittance chart each calculation result when a frequency (for example, a radio signal frequency transmitted and received by the tag 100) f is varied from f=700 MHz to 1200 MHz. The simulation is based on a case such that an affix object 101, of which dielectric constant $\in r$ is $\in r=3$ and thickness t is t=10 mm, is affixed to the tag 100. The chip 105 may be represented equivalently as a parallel circuit of which resistance Rcp is Rcp=1750Ω and a capacitance Ccp is Ccp=1.0 pF, and on the admittance chart, the chip 105 is plotted at a point represented by an open circle. A point obtained by reversing the ± of an imaginary component relative to the position (open circle) of the chip 105 becomes an optimal point (filled circle). At the above optimal point, the imaginary component of the chip 105 and the imaginary component of the dipole sections 103-1, 103-2 have the same magnitude, to cancel each other, and thus, the dipole sections 103-1, 103-2 may resonate with the chip 105.

The bold broken line depicted in FIG. 24 represents a locus ("dipole shorter than $\lambda/2$") of the tag 100 to which the affix object 101 is affixed when there is no inductance section 103. In this case, an imaginary part becomes 0 when the radiation resistance Rap of the dipole sections 103-1, 103-2 is Rap=72Ω.

The thin broken line depicted in FIG. 24 represents a locus ("minute dipole with inductance") when an inductance section 103 is connected to the tag 100 to which the affix object 101 is affixed. The obtained locus (thin broken line) of the tag 100 results after counterclockwise rotation of the locus (bold broken line) having no inductance section 104 as a whole. In the tag 100 to which the inductance section 103 is connected, a position having an operation frequency f=953 MHz is represented with a triangle in FIG. 24, which is overlapped with the optimal point. Therefore, it is possible to consider that an optimal size of the tag 100 relative to the affix object 101, having dielectric constant $\in r=3$ and thickness t=10 mm, is as represented in FIG. 22, for example.

However, the tag 100 is not always affixed to the affix object 101 having the identical dielectric constant $\in r$ and thickness t. The tag 100 may be affixed to an affix object having a different dielectric constant $\in r$ and a different thickness t from those of the affix object 101.

FIG. 25 depicts graphs representing examples of a frequency characteristic with regard to a communication distance when the thickness t of the affix object is changed without change of dielectric constant $\in r$ ($\in r=3$). In the graphs, the dotted line represents a case when the thickness t is t=10 mm, the solid line represents a case when the thickness t is t=20 mm, and the bold line represents a case when the thickness t is t=2 mm, respectively. Such graphs are obtained by the execution of the electromagnetic field simulation. The communication distance becomes maximal at a desired frequency f0 (for example, f0=953 MHz) when the thickness t of the affix object is t=10 mm (the affix object in this case is the affix object 101).

As depicted in FIG. 25, when the thickness t of the affix object is thinned from 10 mm to 2 mm, a frequency producing the maximum communication distance is shifted from the desired frequency f0 to the high frequency side. On the other hand, when the affix object thickness t is thickened from 10 mm to 20 mm, a frequency producing the maximum communication distance is shifted from the desired frequency f0 to the low frequency side.

A reason that the frequency producing the maximum communication distance is shifted from the desired frequency f0 to the high frequency side when the affix object thickness t is thinned is, for example, as follows: If the affix object thickness t is thinned from 10 mm to 2 mm, as the thickness is smaller, so a region having the dielectric constant $\in r=3$ becomes smaller (or a region having the dielectric constant of air $\in r=1$ becomes larger), and thereby an effective dielectric constant $\in e$ becomes smaller. With regard to the relationship of the effective dielectric constant $\in e$ to a wavelength $\lambda$, for example, the following equation holds.

$$\lambda = \lambda 0/\sqrt{(\in e)} \text{ (where } \in 0 \text{ is the length of one wavelength in a free space(for example, air))} \quad (1)$$

Therefore, if the effective dielectric constant $\in e$ becomes smaller, the wavelength $\lambda 0$ of a radio signal propagating through the air is shrunk and shortened. With regard to the relationship of the wavelength $\lambda$ to the frequency f, for example, a relational expression of $$c = f\lambda \text{ (where } c \text{ is light velocity)} \quad (2)$$

holds, and therefore, if the wavelength $\lambda 0$ of a radio signal propagating through the air is shortened, the frequency f is increased. In other words, if the thickness t of the affix object is thinned from 10 mm to 2 mm, a frequency producing the maximum communication distance is shifted from the desired frequency f0 to the high frequency side.

On the other hand, if the affix object thickness t is thickened from 10 mm to 20 mm, because of a reason contrary to the reason in the case of thinned thickness t from 10 mm to 20 mm, a frequency producing a maximum communication distance is shifted to the lower frequency side than the desired frequency f0.

Here, a similar result is obtained when the dielectric constant $\in r$ is changed without change of the thickness t of the affix object. Namely, if the dielectric constant $\in r$ is decreased from "3" to "2" without change of the affix object thickness t, the effective dielectric constant $\in e$ is decreased, and then, from the relationship of expression (1) and expression (2), a frequency producing the maximum communication distance is shifted from the desired frequency f0 to the high frequency side. On the other hand, if the dielectric constant $\in r$ is increased from "3" to "4" or the like, without change of the affix object thickness, oppositely, a frequency producing the maximum communication distance is shifted to the lower frequency side than the desired frequency f0.

As such, when the dielectric constant $\in r$ and the thickness t of the affix object 101 are changed, the frequency producing the maximum communication distance is shifted either to the high frequency side or the low frequency side, and the communication distance at the desired frequency f0 is reduced as compared to that before the change. If the communication distance becomes shorter than the maximum, undesirably the capability of information readout such as ID from a tag becomes smaller.

In consideration of the above-mentioned problem, there is a technique related to the RFID as described below, for example. Namely, with the provision of an auxiliary antenna capable of contacting to or capacitive coupling with a metal portion of the tag antenna in a radio tag vessel, so as to virtually change the length of the tag antenna, the frequency characteristic of a tag antenna may be tuned.

Further, in a non-contact data carrier including an IC chip and a closed-loop antenna, there is a technique for adjusting the dispersion of a resonance frequency by overlaying a conductor such as a metal plate with the closed-loop antenna.

Additionally, in domestic Japan, the Ministry of Internal Affairs and Communications is determined that, by the year 2015, the transition of a frequency for use for the RFID system is to be made from the current frequency band of 952 MHz to 954 MHz to a frequency band of 915 MHz to 927 MHz.

CITATION LIST

Patent Literature

Patent document 1: The Japanese Laid-open Patent Publication No. 2006-295879
Patent document 2: The Japanese Laid-open Patent Publication No. 2006-270813
Patent document 3: The Japanese Laid-open Patent Publication No. 2001-160124

However, in the aforementioned technique of providing the auxiliary antenna in the radio tag vessel, for example, once the position of the radio tag vessel is set, it is not possible to adjust the set radio vessel tag thereafter. Therefore, in such a technique, it is not possible to adjust the position of the radio vessel tag when a frequency for use for radio signal transmission and reception is changed.

Also, although the technique of overlaying the conductor with the closed-loop antenna may suppress a dispersed resonance frequency by a strict setting of the conductor position, if a radio signal frequency for use for transmission and reception changes, strict setting to an appropriate position is to be made to cope with the change. Therefore, in such a technique, when the frequency changes, the position adjustment of the conductor to cope with the change is not easy, and the position adjustment takes a long time.

Moreover, as described earlier, a frequency of 953 MHz is in use in the existing RFID system, and however, if a frequency band for use is shifted to 915 MHz to 927 MHz, the frequency is shifted from the desired frequency f0 to the low frequency side as depicted in FIG. 25, for example. If the frequency is shifted to the low frequency side, the communication distance becomes no more maximal, and instead the communication distance becomes shorter than in the maximal case.

SUMMARY

According to an aspect of the embodiments, a metal sheet including: a first and second metal sections disposed at point symmetrical positions about a center point of the metal sheet, wherein each portion of the first and second metal sections is affixed to a tag so as to contact to the tag which performs non-contact communication.

The object and advantages of the invention will be realized and attained by means of the elements and combinations part particularly pointed out in the claims.

It is to be understood that both the foregoing general description and the following detailed description are exemplary and explanatory and are not restrictive of the invention.

BRIEF DESCRIPTION OF DRAWINGS

FIG. 10 depicts a diagram illustrating an exemplary configuration of a tag set.

DESCRIPTION OF EMBODIMENTS

Hereafter, the present embodiments will be described in detail by reference to the drawings.

First Embodiment

Figure 1:
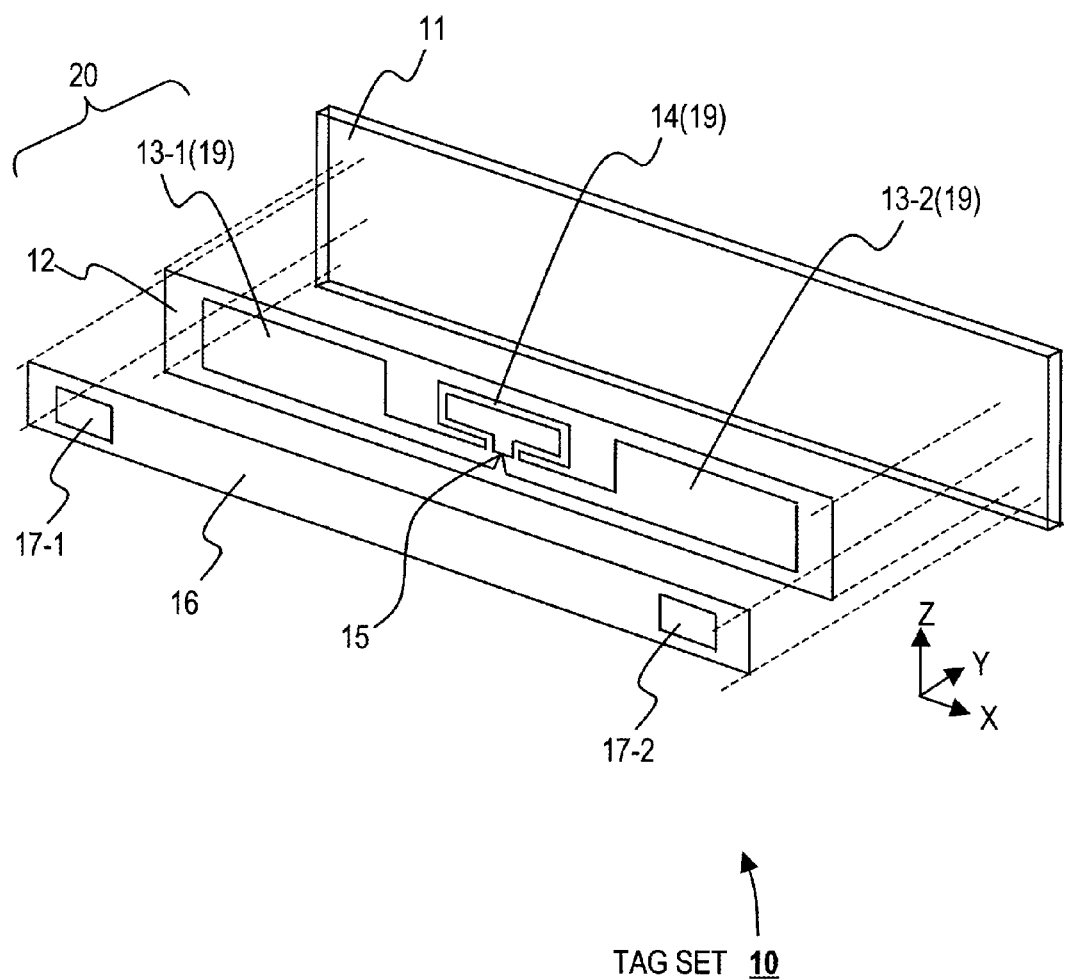
FIG. 1 depicts a diagram illustrating an exemplary configuration of a tag set.
Figure 2:
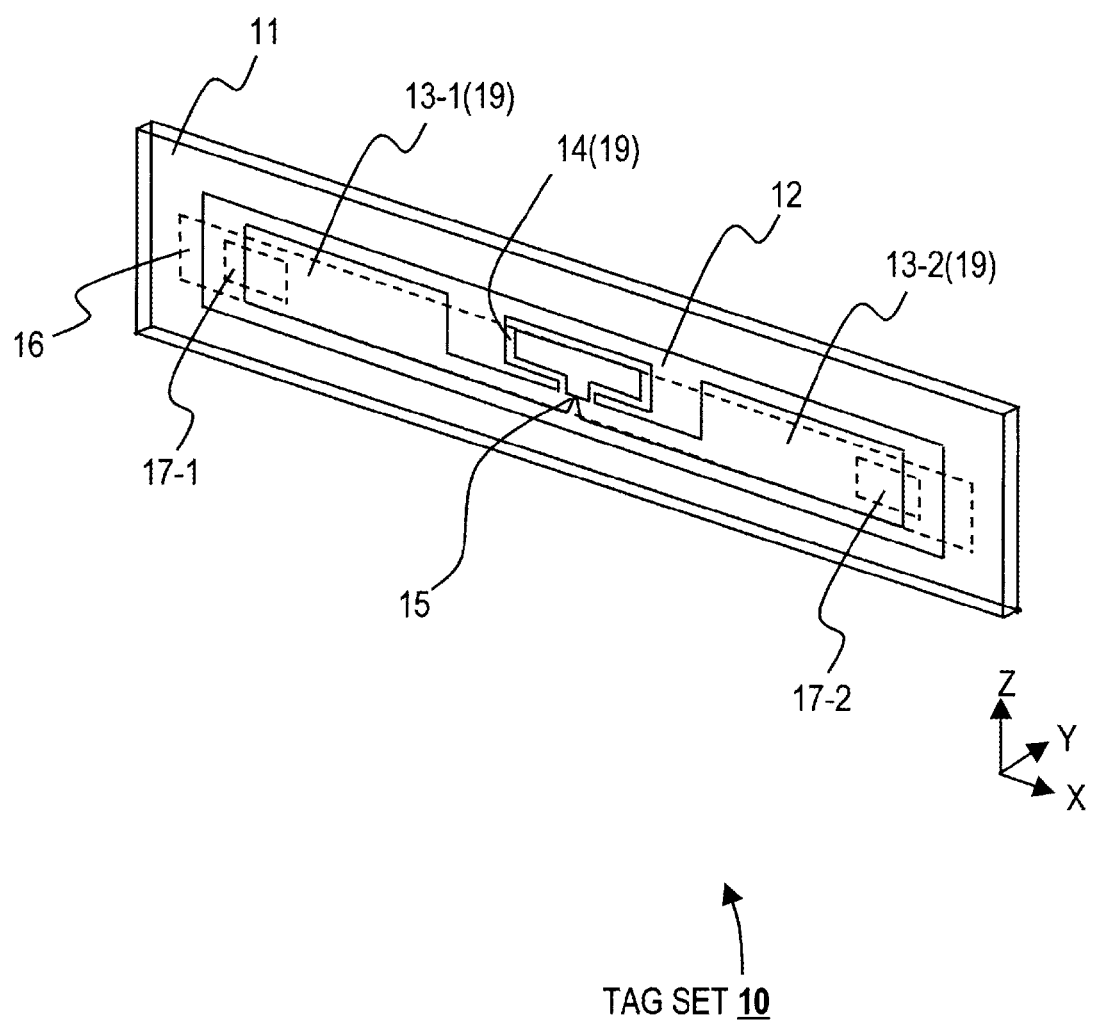
FIG. 2 depicts a diagram illustrating an exemplary configuration of a tag set.
Figure 3:
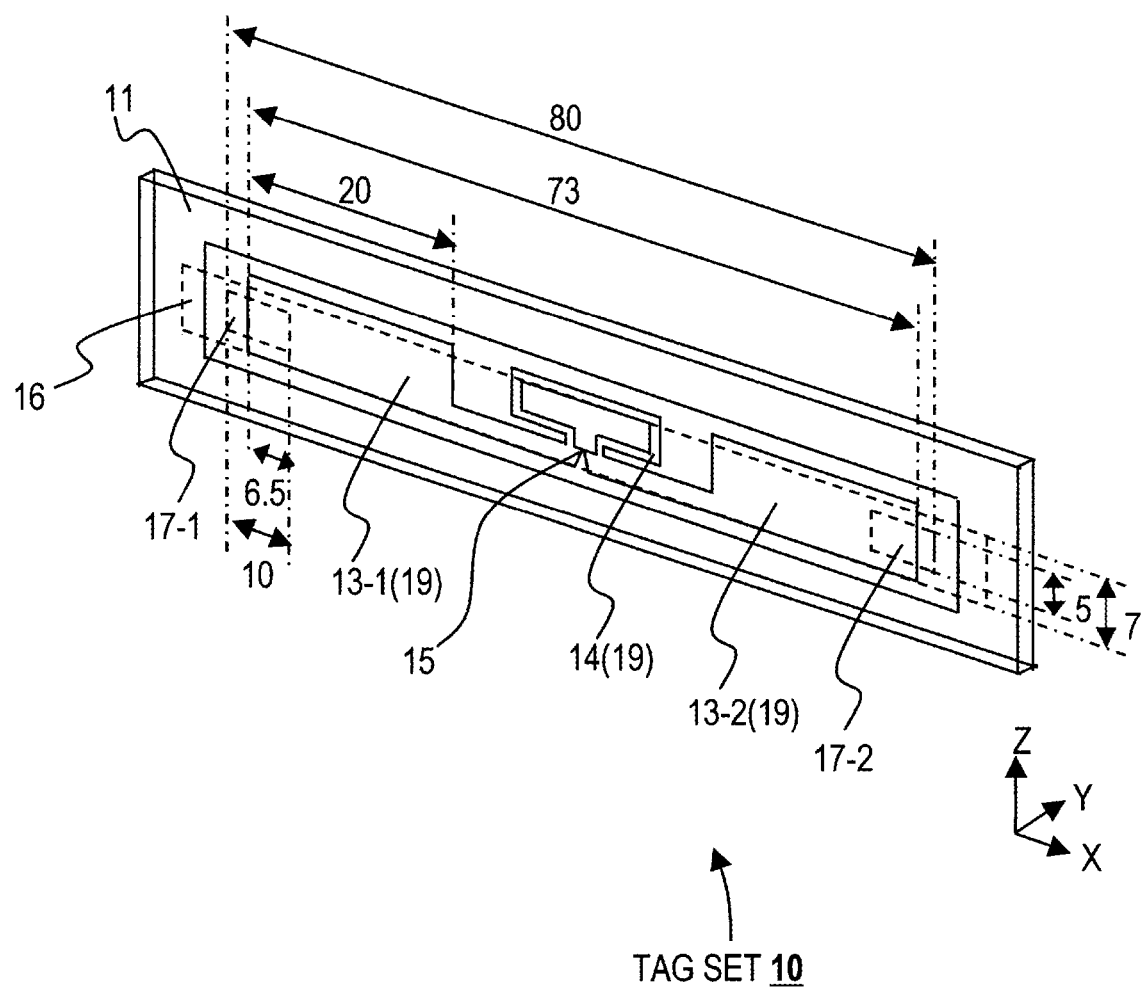
FIG. 3 depicts a diagram illustrating an exemplary configuration of a tag set.
Figure 4A:
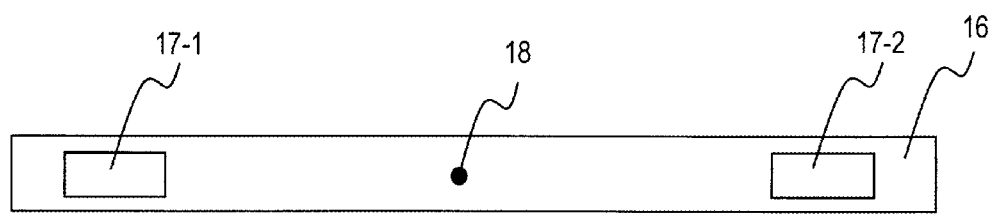
FIG. 4 (A) depicts a diagram illustrating an example of a dummy metal sheet, and FIG. 4 (B) depicts a diagram illustrating an example of a tag sheet.
Figure 4B:
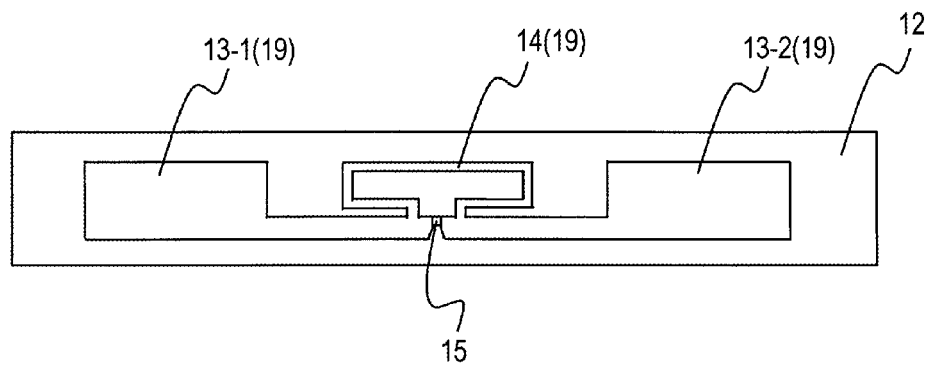
Figure 5:
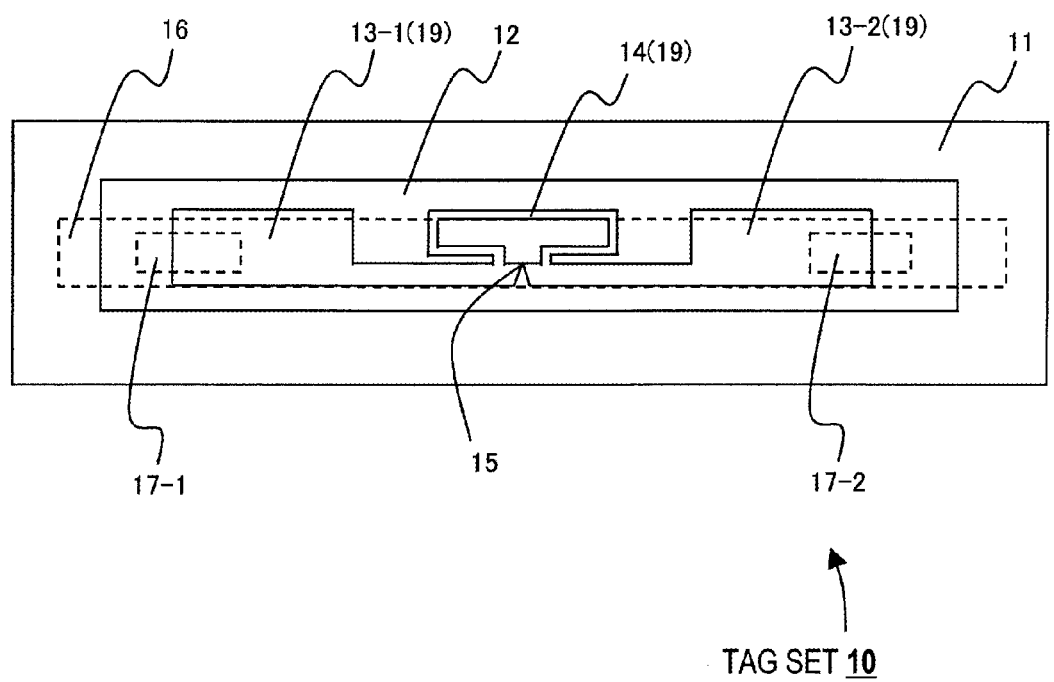
FIG. 5 depicts a diagram illustrating an exemplary configuration of a tag set.

FIG. 1 and FIG. 2 are diagrams respectively illustrating exemplary configurations of a tag set 10, and FIG. 3 is a diagram illustrating an example of the size of each portion of the tag set 10. Also, each of FIG. 4 (A) to FIG. 5 illustrates the front elevation of the tag set 10.

The tag set 10 includes an affix object 11, a tag sheet 12, dipole sections (or dipole antennas) 13-1, 13-2, an inductance section 14, a chip 15, a dummy metal sheet (or metal sheet) 16 and dummy metal sections 17-1, 17-2.

Here, a tag 20 includes the tag sheet 12, the dipole sections 13-1, 13-2, the inductance section 14 and the chip 15. Among them, a tag antenna 19 includes the dipole sections 13-1, 13-2 and the inductance section 14.

Further, in FIG. 1, the X-axis direction is defined as a longitudinal direction, the Y-axis direction is defined as a thickness direction and the Z-axis direction is defined as a width direction. Also, in the present first embodiment, a length may be referred to as a length in the X-axis direction, a thickness may be referred to as a length in the Y-axis direction, and a width may be referred to a length in the Z-axis direction, as the case may be.

The tag 20 is affixed to the affix object 11. Also, the affix object 11 is configured in a manner to be affixed to an article such as a book and a corrugated cardboard on an opposite surface to a surface having the tag 20 affixed thereto.

The present tag set 10 is configured in such a manner that the dummy metal sheet 16 may be affixed to the tag 20, in a state that the tag 20 and the affix object 11 are affixed together. By the affix of the dummy metal sheet 16 to the tag 20, a frequency characteristic with regard to a communication distance varies, so that the communication distance is maximized at a desired frequency f0. The detail will be described later.

Next, a description is given on each portion of the tag set 10.

The affix object 11 is, for example, a dielectric having a dielectric constant ∈r=3 and a thickness (length in the Y-axis direction) t=2 mm, and is formed of a plastic such as an ABS resin, a polycarbonate, etc. Additionally, in the present first embodiment, the dielectric constant ∈r of the affix object 11 is set to be the same dielectric constant (∈r=3) as the affix object 101 depicted in FIG. 22, whereas the thickness t (=2 mm) is set thinner than the thickness t of the affix object 101 (=10 mm).

The tag sheet 12 is formed of, for example, paper, film and PET (polyethylene terephthalate). The tag sheet 12 includes the dipole sections 13-1, 13-2, the inductance section 14 and the chip 15.

The dipole sections 13-1, 13-2 are formed to have, for example, left-right symmetry in the X-axis direction about the chip 15, and capable of receiving a radio signal transmitted from, for example, a reader/writer, extracting electric power and outputting it to the chip 15. Also, the dipole sections 13-1, 13-2 are configured to be able to include information, read out from the chip 15, into a response signal to the radio signal received from the reader/writer, for example, and also to transmit the response signal to the reader/writer as a radio signal. In the example depicted in FIG. 3, an outermost distance (or a distance between tips) of the dipole sections 13-1, 13-2 in the X-axis direction is set to be 73 mm, and a width (a length in the Y-axis direction) is set to be 7 mm. Let the resonance frequency of the tag antenna 19 be λ, then the length of 73 mm, which is the length of the dipole sections 13-1, 13-2, is shorter than λ/2 (about 160 mm when a transmission/reception radio signal frequency is 953 MHz, for example). Further, each dipole section 13-1, 13-2 has a larger line width (in the Z-axis direction) portion in comparison with other portions, to enable expanding the area of the dipole section 13-1, 13-2. In the example depicted in FIG. 3, a length at the larger width portion is set to be 20 mm. In addition, the dipole sections 13-1, 13-2 may be represented equivalently by a parallel circuit composed of a radiation resistor Ra and an inductance La.

Figure 24:
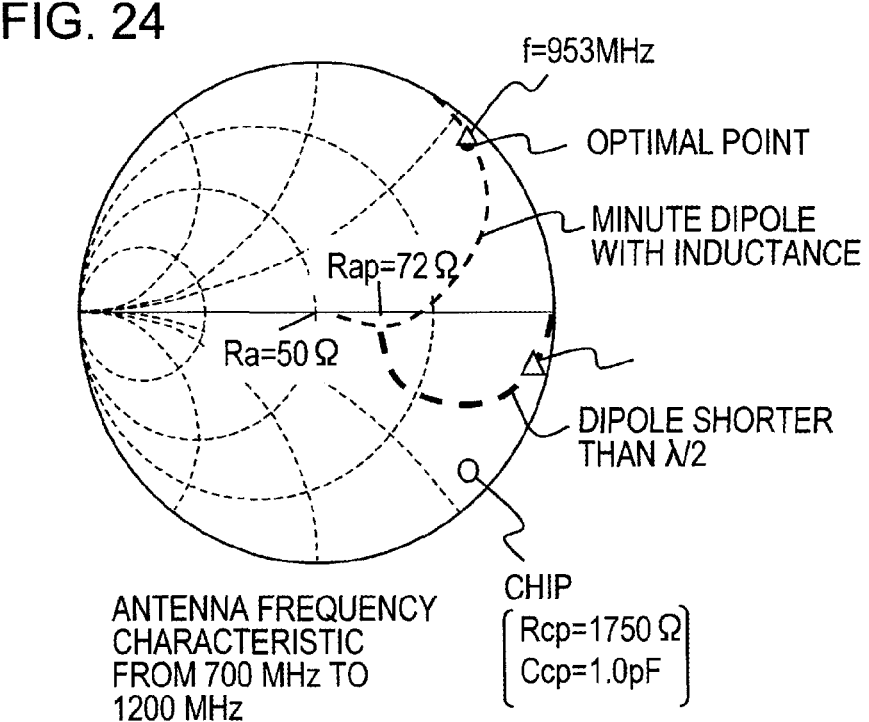
FIG. 24 depicts a diagram illustrating an example of an admittance chart.

The inductance section 14 is connected in parallel to the dipole sections 13-1, 13-2 to surround the chip 15. The inductance section 14 may be formed to match the chip 15 with the dipole sections 13-1, 13-2, thereby enabling sufficient supply of reception power at the dipole sections 13-1, 13-2 to the chip 15. For example, in the admittance chart (FIG. 24 for example), a locus ("minute dipole with inductance") when an inductance section 14 is provided may be obtained by rotating counterclockwise the whole of a locus ("dipole shorter than λ/2") produced when no inductance section 14 is provided. By this, it is possible for the inductance section 14 to match the dipole sections 13-1, 13-2 with the chip 15 at a desired frequency f0 (for example, 953 MHz).

Figure 22:
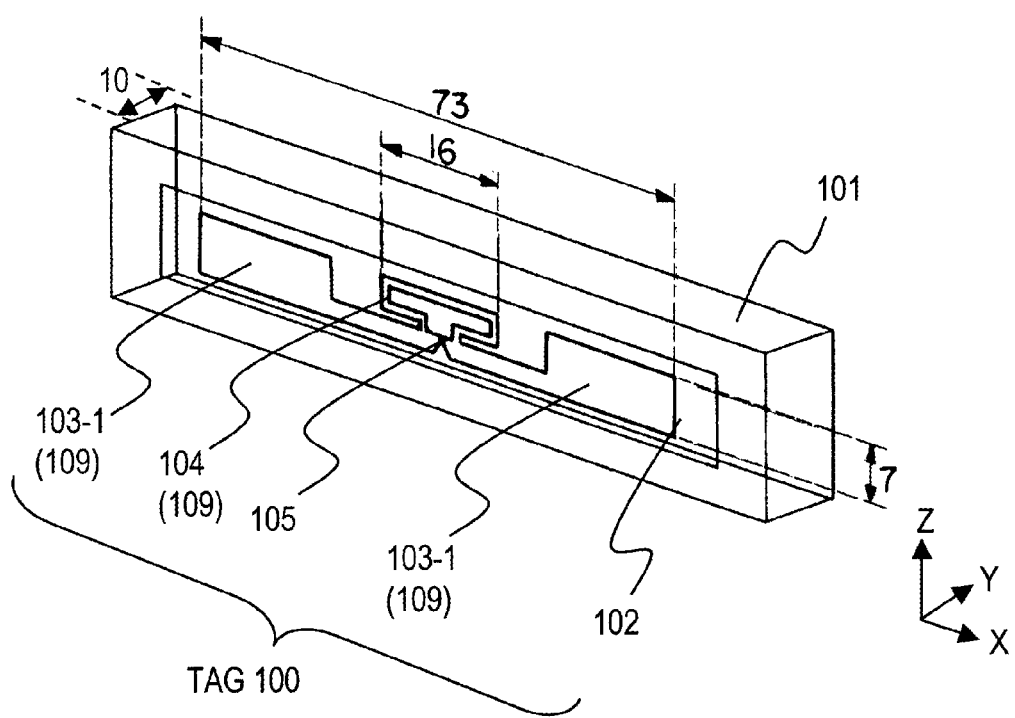
FIG. 22 depicts a diagram illustrating an exemplary configuration of a tag set.

Additionally, as an example, the dipole sections 13-1, 13-2 and the inductance section 14 have the same size as the above-mentioned tag 100 depicted in FIG. 22. The lengths of the dipole sections 13-1, 13-2 and the inductance section 14 are 73 mm and 16 mm, respectively. With the above sizes, when a dielectric of which dielectric constant ∈r is ∈r=3 and thickness t is t=10 is affixed to the tag 20, a communication distance becomes maximal at the desired frequency f0 (for example, 953 MHz), for example.

The chip 15 is disposed substantially at the center of the dipole sections 13-1, 13-2 in the X-axis direction, and has a rectangular shape of which length in the X-axis direction and length in the Z-axis direction are 1 mm or less, respectively. The chip 15 is possible to store information, such as ID related to an article. The chip 15 may be represented equivalently as a parallel circuit of a resistor Rcp and a capacitor Ccp.

Additionally, the dipole sections 13-1, 13-2, the inductance section 14 and the chip 15 formed on the tag sheet 12 are formed of metal of which principal component is copper (Cu), silver (Ag) or aluminum (Al), for example. Such a metal may be formed by coating a paste-shaped silver (or Ag paste), vapor depositing aluminum (or Al vapor deposition), Cu etching, etc.

The dummy metal sheet 16 is formed of paper, film and PET, for example. The dummy metal sheet 16 includes dummy metal sections 17-1, 17-2 at least one each disposed at each point symmetrical position about a center point 18 of the dummy metal sheet 16. In the example depicted in FIG. 4 (A), there are provided the dummy metal sections 17-1, 17-2, one on the right and one on the left. Additionally, the dummy metal sheet 16 may have an adhesive agent coated on a surface that contacts to the tag 20 side, or on both surfaces. By this, the metal sheet 16 may be affixed to the tag 20.

The dummy metal sections 17-1, 17-2 are formed of, for example, a metal of which principal component is copper (Cu), silver (Ag) or aluminum (Al), and may be formed by Ag paste, Al vapor deposition, Cu etching, etc. In the example depicted in FIG. 3, each dummy metal section 17-1, 17-2 is of a rectangular shape of which length in the X-axis direction is 10 mm and length in the Z-axis direction is 5 mm. Also, an outermost length (or distance between tips) of the dummy metal sections 17-1, 17-2 in the X-axis direction is, for example, 80 mm, which is longer than 73 mm i.e. the distance between the tips of the dipole sections 13-1, 13-2.

Furthermore, when the dummy metal sheet 16 is affixed to the tag 20, the dummy metal sections 17-1, 17-2 are configured to be affixed in an overlapped manner with the dipole sections 13-1, 13-2. Alternately, the dummy metal sheet 16 is affixed to the tag 20 in a manner to contact through the dummy metal sheet 16 to the dipole sections 13-1, 13-2. At that time, the dummy metal sections 17-1, 17-2 are affixed in an overlapped manner with the tips of the dipole sections 13-1, 13-2 on the opposite side to the inductance section 14 in the X-axis direction (hereafter referred to as "tips of the dipole sections 13-1, 13-2"). In the example depicted in FIG. 3, the dummy metal sections 17-1, 17-2 and the dipole sections 13-1, 13-2 are affixed in such a manner as to form an overlap portion of 6.5 mm in the X-axis direction, with a protrusion of 3.5 mm to the outside from each tip of the dipole sections 13-1, 13-2 in the X-axis direction.

When the dummy metal sheet 16 is affixed to the tag 20 in such a manner, by the overlap of the tips of the dipole sections 13-1, 13-2 with the dummy metal sections 17-1, 17-2, it is possible to restore a frequency that produces the maximum communication distance to the desired frequency f0. The reason will be described in the following.

The size of the tag 20 (or the dipole sections 13-1, 13-2 and the inductance section 14) is adjusted such that the dipole sections 13-1, 13-2 match with the chip 15, when the affix object 101 of which dielectric constant ∈r is ∈r=3 and thickness t is t=10 mm is affixed thereto. The communication distance of the tag 20 adjusted as such is maximal at the desired frequency f0 (for example, FIG. 22 and FIG. 25).

Figure 25:
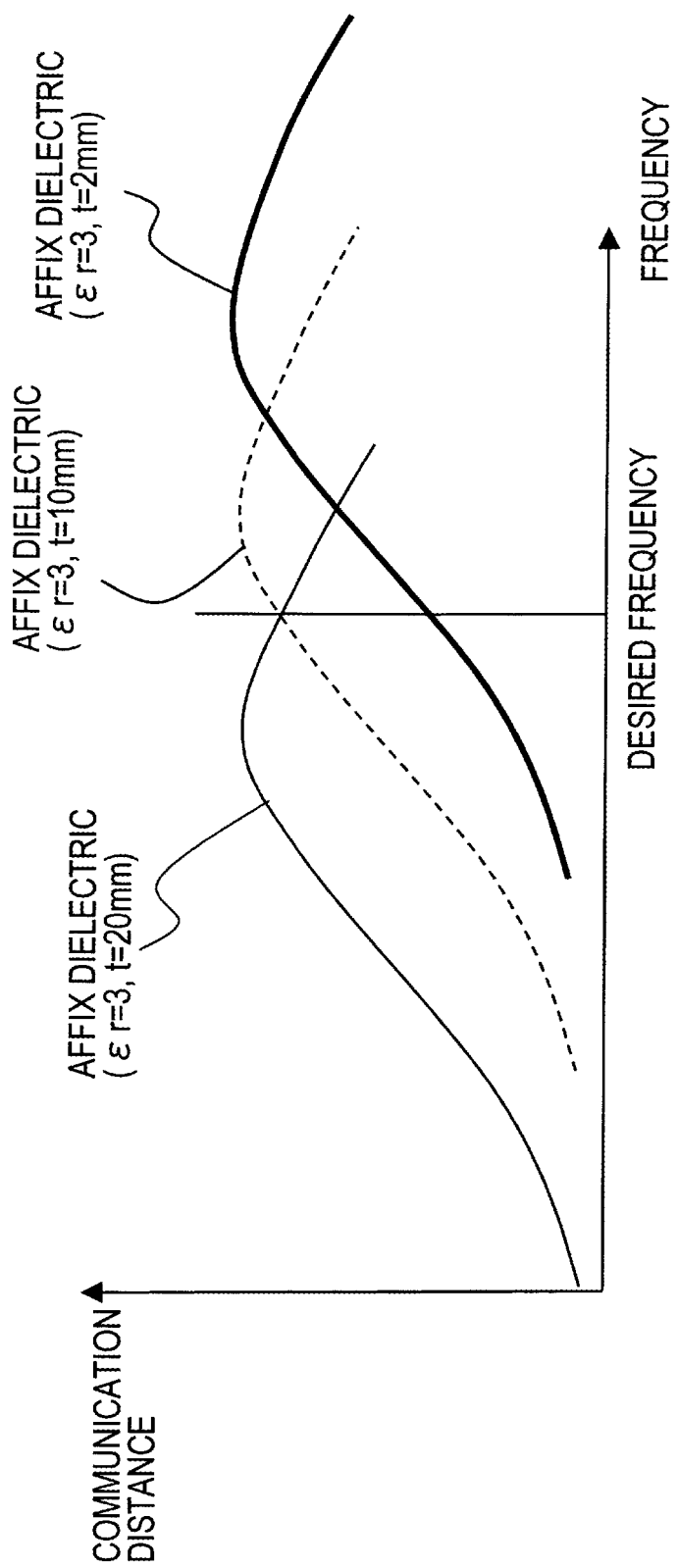
FIG. 25 depicts an exemplary graph illustrating the relationship of a communication distance to a frequency.

To such the tag 20, when the affix object 11 of which dielectric constant ∈r is the same as ∈r=3 and thickness t is thinned from t=10 mm to t=2 mm is affixed, a frequency producing the maximum communication distance is shifted as large as 100 MHz from the desired frequency f0 to a higher frequency side (for example, the bold line in FIG. 25). In order to shift to the desired frequency f0 a frequency producing the maximum communication distance which is shifted to the high frequency side, the frequency producing the maximum communication distance may be shifted to a lower frequency side. For example, it may be possible to shift to the low frequency side as a whole so that the graph is the same as in the case when the dielectric constant ∈r is ∈r=3 and the thickness t is t=10 mm, and to shift so that the maximum communication distance is obtained at the desired frequency.

For that purpose, in order to shift the frequency f to the low frequency side, the wavelength λ may be elongated, because in the aforementioned expression (2), the frequency f has an inversely proportional relation to the wavelength λ of a radio signal received and transmitted by the tag antenna 19.

Here, the length of the dipole sections 13-1, 13-2 is shorter than (λ1)/2, where λ1 is a resonance frequency, and it is possible to say that the length of the dipole sections 13-1, 13-2 has a proportional relation to the wavelength λ. Therefore, to elongate the wavelength λ, the length of the dipole sections 13-1, 13-2 may be set longer than 73 mm. By elongating the length of the dipole sections 13-1, 13-2 to be longer than 73 mm, a frequency producing the maximum communication distance may be shifted to the low frequency side.

Figure 6:
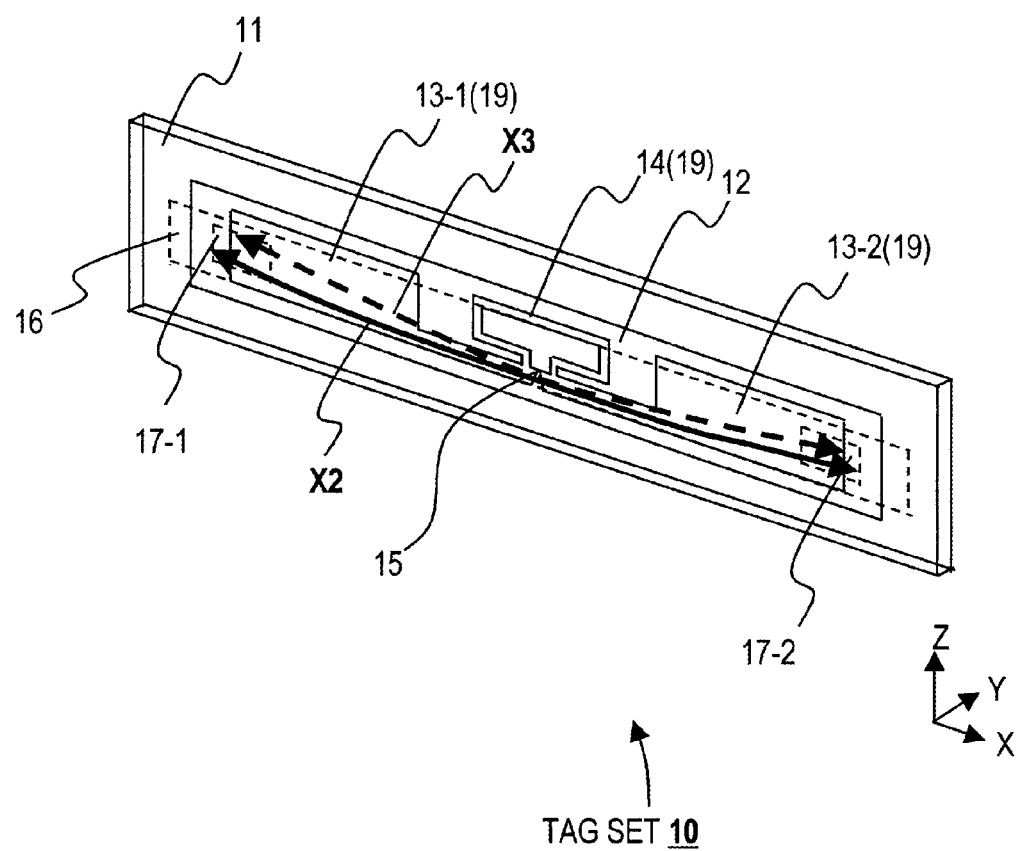
FIG. 6 depicts a diagram illustrating an example of a current path.

FIG. 6 depicts an example of a current path in the tag set 10, in which the dotted line (X3) depicts an example of a current path when no dummy metal section 17-1, 17-2 is provided, and the solid line (X2) depicts an example of a current path when the dummy metal sections 17-1, 17-2 are provided, respectively. As may be understood from this FIG. 6, the case provided with the dummy metal sections 17-1, 17-2 has a longer current path than the case of no provision of dummy metal section 17-1, 17-2.

Namely, by the affix of the dummy metal sheet 16 to the tag 20 and by the affix of the dummy metal sections 17-1, 17-2 overlapped with the tips of the dipole sections 13-1, 13-2, an apparent length of the dipole sections 13-1, 13-2 is elongated. By a current flow in the elongated portions, the current path may be elongated as compared to the case of the dipole sections 13-1, 13-2 alone, and thus, a frequency producing the maximum communication distance may be shifted to the low frequency side.

Here, the dummy metal sheet 16 exists between the dummy metal sections 17-1, 17-2 and the dipole sections 13-1, 13-2. However, in the case of a high-frequency radio signal, the overlap of the dummy metal sections 17-1, 17-2 with the dipole sections 13-1, 13-2 may be considered to be the same as the dummy metal sections 17-1, 17-2 in connection to the dipole sections 13-1, 13-2, if both overlapped sections are insulated each other by the dummy metal sheet 16.

When the thickness t of the affix object is thinned from 10 mm to 2 mm, the electromagnetic field simulation results in that a frequency producing the maximum communication distance is shifted as large as 100 MHz to a higher frequency side than the desired frequency f0. Because of an about 10% shift to the high frequency side from the desired frequency f0, a distance between the tips of the dummy metal sections 17-1, 17-2 is elongated to be 80 mm, that is, about 10% longer than the distance (length) of 73 mm between the tips of the dipole sections 13-1, 13-2. As a result of the electromagnetic field simulation of the tag set 10 executed for a case such that the dummy metal sheet 16, having the distance between the tips of the dummy metal sections 17-1, 17-2 set to be 80 mm, is affixed to the tag 20 to which the affix object 11 is affixed, the communication distance becomes maximal at the desired frequency f0.

Figure 7:
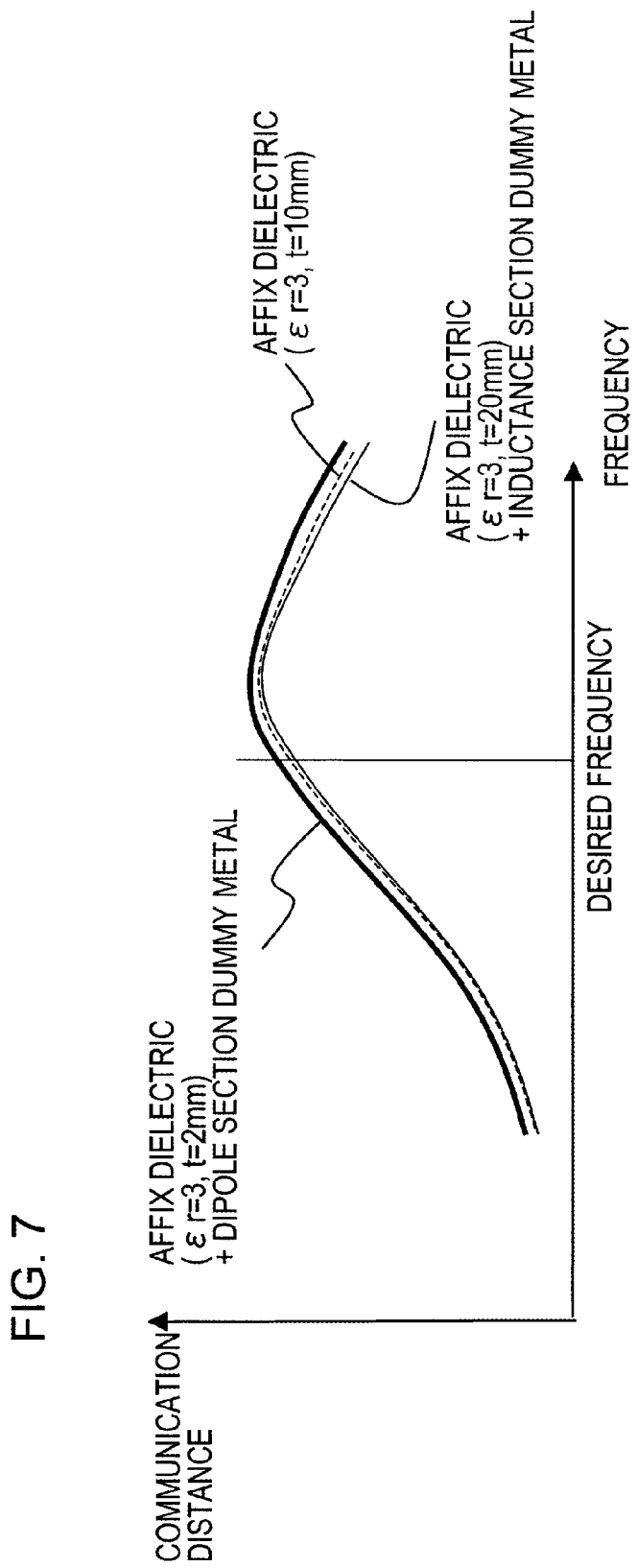
FIG. 7 depicts an exemplary graph illustrating the relationship of a communication distance to a frequency.

FIG. 7 is a graph illustrating an example of the frequency characteristic of a communication distance obtained by electromagnetic field simulation. The dotted line represents an example of the frequency characteristic in regard to the communication distance of the tag antenna 109, in the tag 100 depicted in FIG. 22 ("affix dielectric ($\in r=3$, t=10 mm)"). Also, the bold line represents an example of the frequency characteristic in regard to the communication distance of the tag antenna 19, in the present tag set 10 to which the dummy metal sheet 16 is affixed ("affix object ($\in r=3$, t=20 mm)"). In both antennas 109, 19, the dipole sections 103-1, 103-2, 13-1, 13-2 are of the same size, and also the inductance sections 104, 14 are of the same size. As represented by the bold line in FIG. 7, in the tag set 10 having the dummy metal sheet 16 affixed thereto, there is obtained a simulation result that the communication distance is maximal at the desired frequency f0.

Here, the electromagnetic field simulation is executed in such a manner that the chip 15 is set to be a feeding point, and each current of a different frequency (f=700 MHz to 1200 MHz, for example) is made to flow from the feeding point to the tag antenna 19. Then, by the measurement of the reflection index etc. of the dipole sections 13-1, 13-2 in the electromagnetic field simulation, such a graph as depicted in FIG. 7 illustrating the relationship between the frequency and the communication distance is obtained.

Also, the distance of 80 mm between the tip ends of the dummy metal sections 17-1, 17-2 is one example, and the distance may have different values appropriately according to the thickness t (or the dielectric constant $\in r$) of the affix object 11.

Here, in regard to the affix, the total outermost distance of the dummy metal sections 17-1, 17-2 with the dipole sections 13-1, 13-2, in which the dummy metal sections 17-1, 17-2 are overlapped with the tips of the dipole sections 13-1, 13-2, may be maintained to be, for example, 80 mm. If the distance is maintained as such, the dummy metal sheet 16 may be affixed to the tag 20 in a deviating manner to some extent in the X-axis direction.

Figure 8:
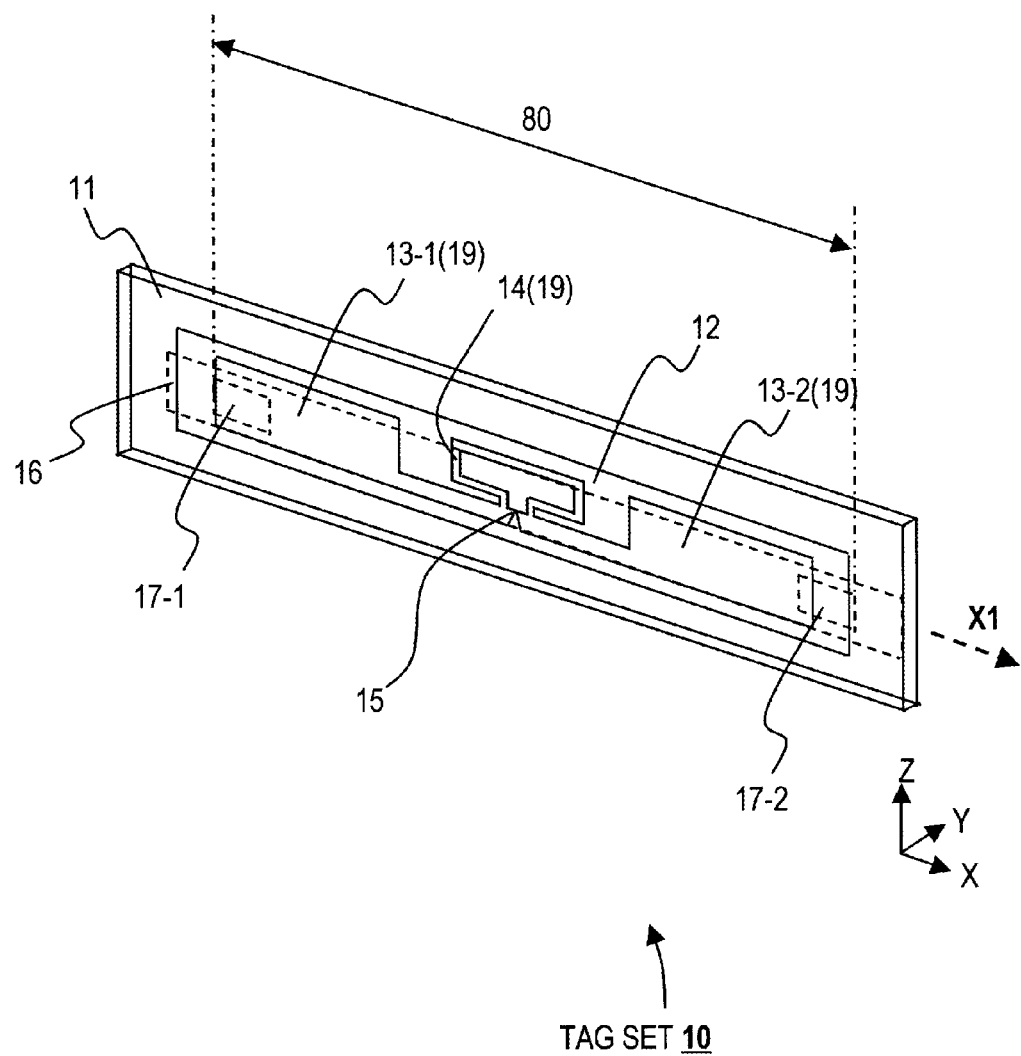
FIG. 8 depicts a diagram illustrating an exemplary configuration of a tag set.

FIG. 8 illustrates an exemplary case that the dummy metal sheet 16 is affixed with a deviation of approximately 3.5 mm to the X1 direction (for example, the X1 direction is in parallel to the X-axis). In this case also, the dummy metal sections 17-1, 17-2 are overlapped with the tips of the dipole sections 13-1, 13-2. Also, the total outermost distance of two sections i.e. the dipole sections 13-1, 13-2 and the dummy metal sections 17-1, 17-2 is maintained to be 80 mm. If the above distance is maintained, $\lambda$ in expression (2) does not change, and therefore the frequency f does not change. Thus, a frequency producing a maximum communication distance may be maintained to be the desired frequency f0.

Additionally, in regard to the affix of the dummy metal sheet 16 to the tag 20, a deviation to the Z-axis direction is also allowable. The reason is that, from the relational expression of expression (2), there is no change in that the maximum communication distance is produced at the desired frequency f0.

Here, let L1 be the length of an overlapped portion between the dipole section 13-1 and the dummy metal section 17-1, L2 be an allowance in the deviation of the dummy metal sheet 16 to the X-axis direction at the affix, and L4 be the length of the dipole section 13-1 at the large width portion, respectively, then L1, L2, L4 may be determined in a manner to satisfy the relational expression of:

$$L2<L1<L4-L2 \qquad (3)$$

In the example depicted in FIG. 3, L1=6.5 mm and L4=20 mm are set. For example, when the allowance L2 is set to be L2=2 mm, the relational expression of expression (3) is satisfied.

Figure 9:
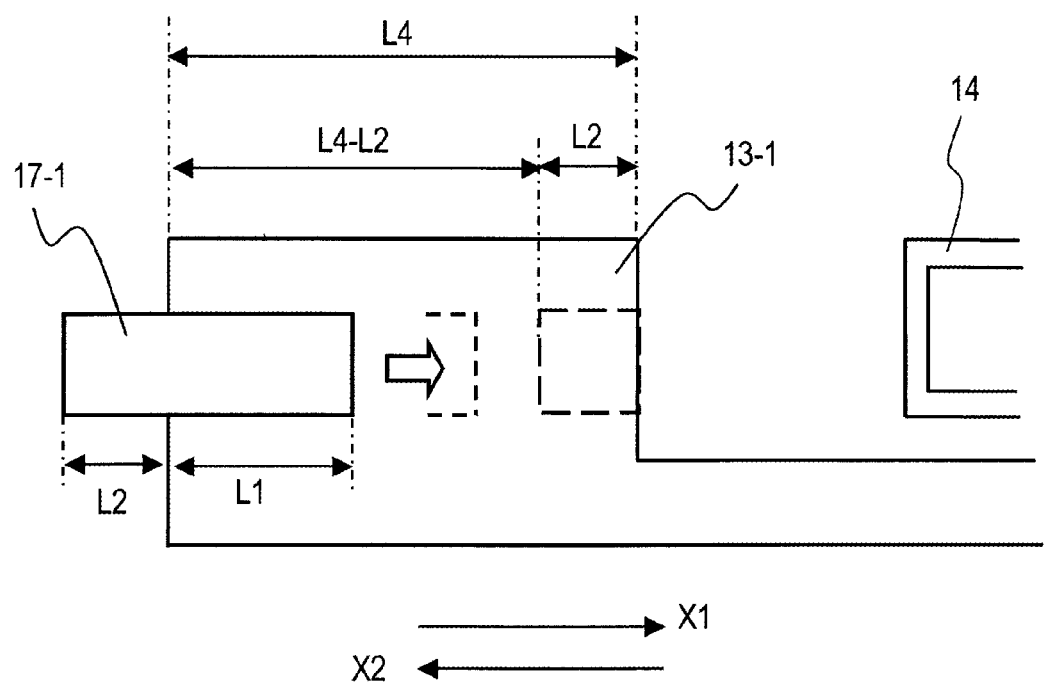
FIG. 9 depicts a diagram illustrating an example of relationship among L1, L2 and L4.

FIG. 9 is a diagram to explain the above relational expression. As represented by an arrow in FIG. 9, consider a case that the length L1 of the overlapped portion is gradually increased to the inductance section 14 side (X1 direction), and the length L1 comes to satisfy the relation of L4−L2<L1. In this case, if the dummy metal section 17-1 is shifted to the X1 direction even only a small amount, the dummy metal section 17-1 protrudes to the inductance section 14 side. If the dummy metal section 17-1 protrudes to the inductance section 14 side, for example, a current flowing through the inductance section 14 changes, and also a current flowing through the dipole section 13-1 changes. For example, by the current change flowing through the dipole section 13-1, a matching condition changes and also the frequency characteristic comes to change. Therefore, the allowance L2 for allowing the dummy metal sheet 16 to deviate to the X-axis direction may be determined in a manner to satisfy expression (3).

Therefore, when the dummy metal sheet 16 is affixed to the tag 20 with the distance maintained to be, for example, 80 mm, if L1, L2 and L4 are set in a manner to satisfy expression (3), a frequency producing the maximum communication distance is the same as the frequency before the deviation to the X1 direction, even if a deviation as large as L2 is made to the X1 direction.

The above is also applicable to the dipole section 13-2 on the opposite side, for example. Namely, even if the dummy metal sheet 16 deviates to an X2 direction, a frequency producing the maximum communication distance is the same as the frequency before the deviation to the X2 direction, if the distance is maintained to be, for example, 80 mm, and L1, L2 and L4 are set in a manner to satisfy expression (3).

Additionally, as depicted in FIG. 3, each length (or width) of the dummy metal sections 17-1, 17-2 in the Z-axis direction is set to be 5 mm. However, as described above, the frequency characteristic in regard to the communication distance is almost determined by the current path length in the X-axis direction (for example, FIG. 6), and therefore, as compared to the current path length, each width of the dummy metal sections 17-1, 17-2 does not influence so much upon the frequency characteristic in regard to the communication distance.

FIG. 10 is a diagram illustrating another exemplary configuration of the tag set 10. It may also be possible to dispose the dummy metal sheet 16 between the tag sheet 12 and the affix object 11. For example, at factory shipment, the tag sheet 12, the dummy metal sheet 16 and the affix object 11 may be in a state of being affixed altogether. With regard to the affix of the dummy metal sheet 16, for example an operator at the factory may affix with a deviation to the X1 direction or the X2 direction as large as the allowance L2. In addition, in this case, for example, the entire tag set 10 may be laminated with another sheet composed of film, PET, paper, etc.

Figure 11A:
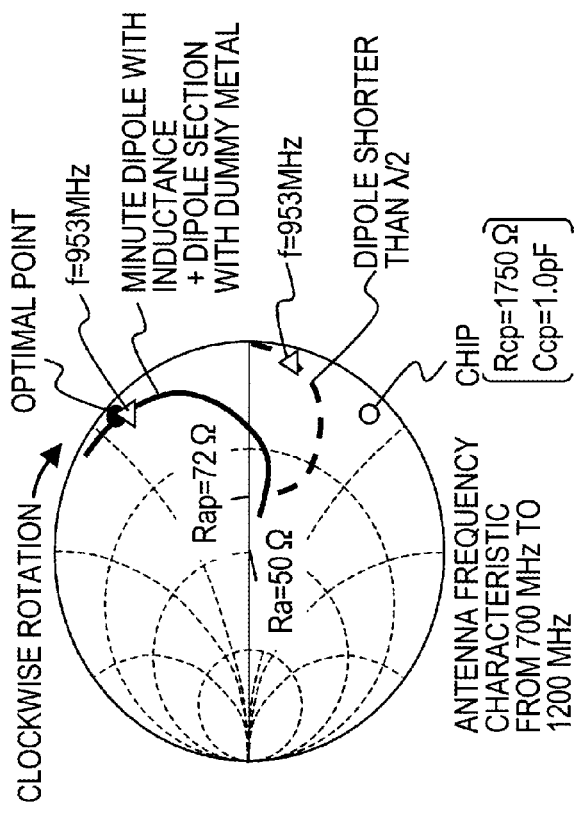
FIG. 11 (A) and FIG. 11 (B) depict diagrams respectively illustrating examples of admittance charts.
Figure 11B:
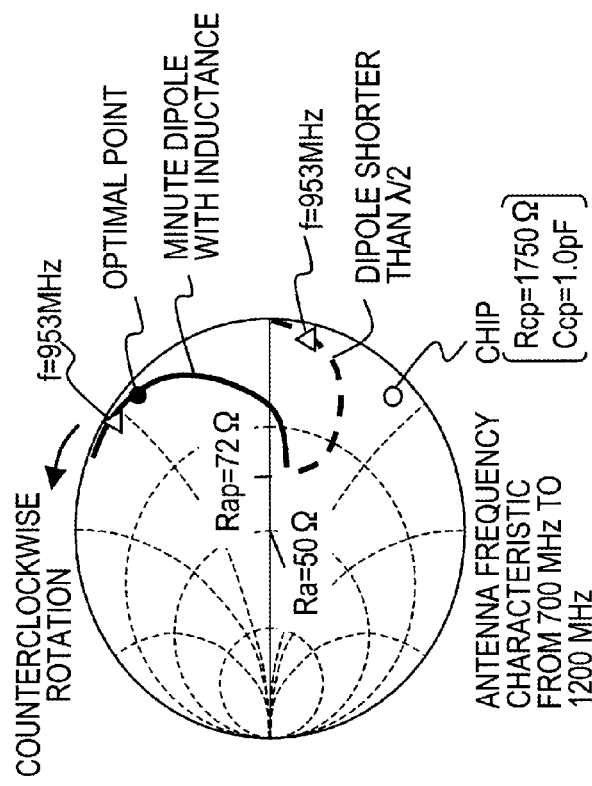

FIGS. 11 (A) and 11 (B) depict examples of admittance charts. In the figures, FIG. 11 (A) depicts an example of the admittance chart, when the thickness t of the affix object 101 to the tag 100 depicted in FIG. 20 (or the tag 20 depicted in FIG. 1 etc.) is changed from 10 mm to 2 mm (the affix object at this time becomes the affix object 11). Also, FIG. 11 (B) depicts an example of the admittance chart of the tag set 10 to which the dummy metal sheet 16 is affixed. Both drawings are obtained by performing electromagnetic field simulation to plot calculation results on the admittance chart, when the frequency f is changed from 700 MHz to 1200 MHz.

The bold line depicted in FIG. 11 (A) represents a locus ("minute dipole with inductance") when the inductance section 14 is connected in parallel to the dipole sections 13-1, 13-2, and the affix object 11 of which dielectric constant ∈r is ∈r=3 and thickness t is t=2 mm is affixed. As compared to FIG. 22, the overall locus is rotated counterclockwise because the thickness of the affix object is changed from t=10 mm to t=2 mm. The reason is that, in proportion as the affix object thickness is thinned from 10 mm to 2 mm, a portion having dielectric constant ∈r=3 is reduced and a portion having ∈r=1, the dielectric constant of air, is increased, and accordingly, an effective dielectric constant in the periphery of the tag antenna 19 becomes relatively small. When the desired frequency f0 is set to be f0=953 MHz, a position on the admittance chart is plotted at a position depicted with a triangle, which is located at a position deviating from the optimal point.

At the optimal point, as described earlier, for example the imaginary component of the chip 15 and the imaginary component of the dipole sections 13-1, 13-2 are mutually canceled with the same magnitude, so that the dipole sections 13-1, 13-2 may resonate with the chip 15.

On the other hand, the bold line depicted in FIG. 11 (B) represents a locus ("minute dipole with inductance+dummy metal sheet") when the inductance section 14 is connected in parallel to the dipole sections 13-1, 13-2 and the affix object 11 is affixed to the tag 20, and further, the dummy metal sheet 15 is affixed to the tag 20.

As depicted with the bold line in FIG. 11 (B), when the dummy metal sheet 16 is affixed, the locus depicted with the bold line in FIG. 11 (A) is rotated clockwise, and comes to be overlaid with the optimal point at the desired frequency f0. As may be understood from the figure, the tag antenna 19 resonates with the present tag set 10 at the desired frequency f0, so that sufficient power may be supplied from the dipole sections 13-1, 13-2 to the chip 15. Further, as also depicted with the aforementioned bold line in FIG. 7, the desired frequency f0 may produce the maximum communication distance of the tag set 10.

Additionally, the locus depicted with the bold line in FIG. 10 (B) is such a locus that the triangle of f=953 MHz moves to the lower right on the same locus as depicted with the bold line in FIG. 11 (A).

Also, in regard to the electromagnetic field simulation, the result is obtained, for example, by setting the chip 15 to be a feeding point and making a current flow of a different frequency (f=700 MHz to 1200 MHz) from the feeding point to the tag antenna 19, and measuring the reflection index etc. of the dipole sections 13-1, 13-2.

In the aforementioned first embodiment, the description is given on the example when the thickness t of the affix object is changed without change of the dielectric constant ∈r. It is also possible to obtain a similar embodiment by decreasing the dielectric constant ∈r of the affix object from ∈r1 to ∈r2 (∈r2<∈r1) without change of the thickness t. If the dielectric constant ∈r is decreased from ∈r1 to ∈r2, effective dielectric constant in the periphery of the tag antenna 19 becomes smaller in proportion as the dielectric constant is decreased, similar to the case of decreasing the thickness t of the affix object. Therefore, when the dielectric constant ∈r of the affix object is decreased from ∈r1 to ∈r2 without change of the thickness t, a graph illustrating the relationship of the communication distance to the frequency may be depicted with the bold line in FIG. 25, for example, similar to the case of thinning the thickness t. In this case, a frequency f that produces a maximum communication distance is shifted to the higher frequency side than the desired frequency f0, and therefore, by the affix of the dummy metal sheet 16 in a similar manner to the aforementioned example, a frequency producing the maximum communication distance may be restored to the desired frequency f0.

As having been described above, according to the present first embodiment, in regard to a tag 20 optimized to produce the maximum communication distance at the desired frequency f0 with a certain dielectric constant ∈r and a certain thickness t, the tag 20 is operated by the affix to a dielectric having a different dielectric constant ∈r and a different thickness t. At this time, by the affix of the dummy metal sheet 16 to the tag 20, a frequency producing the maximum communication distance may be restored to the desired frequency f0. Further, in regard to the affix of the dummy metal sheet 16, if each dummy metal section 17-1, 17-2 is overlapped with each tip of the dipole sections 13-1, 13-2, and if the outermost distance is maintained to be, for example, 80 mm to satisfy expression (3), a deviation as large as the allowance L2 is acceptable. Thus, the position adjustment of the dummy metal sheet 16 becomes easier than a case of precise adjustment.

Further, it is determined that, by the year 2015, the transition of a frequency for use for RFID in domestic Japan will be made from 953 MHz to 915-927 MHz, a lower frequency side. For example, in FIG. 25, in regard to an RFID adjusted to have a maximum communication distance at a desired frequency f0 (for example 953 MHz), if the use frequency thereof is shifted to the low frequency side, the communication distance becomes smaller than the maximum value. In this case, to obtain the maximum communication distance, a frequency producing the maximum communication distance may be shifted from f0 to the low frequency side so that maximization at the desired frequency f0 is modified to maximization at a lower frequency side than the desired frequency f0. According to the present first embodiment, a shift to the low frequency side may be obtained by the affix of the dummy metal sheet 16, and therefore, it is possible to maximize the communication distance at 915-927 MHz. As such, the present dummy metal sheet 16 is also effective to the frequency transition.

For example, when the tag 20 is affixed to a book at a bookstore or a library, a frequency producing the maximum communication distance may be shifted to the low frequency side if an operation staff affixes the dummy metal sheet 16 onto the tag 20. Moreover, the labor and the time of the operation staff may be saved without need of a precise work on the basis of, for example, 1 mm by the operation staff, because a deviation as large as the allowance L2 of about 3.5 mm does not change a frequency producing the maximum communication distance.

Second Embodiment

Next, a second embodiment will be described. In the first embodiment, there is described an example in which the dummy metal sheet 16 is affixed to the tag 20 in such a manner that the tips of the dipole sections 13-1, 13-2 are overlapped with the dummy metal sections 17-1, 17-2. In the second embodiment, there is disclosed an example in which a dummy metal sheet (or metal sheet) 22 is affixed to the tag 20 such that the dummy metal sections 23-1, 23-2 are overlapped with the inductance section 14. FIG. 12 through FIG. 20 are diagrams each illustrating an exemplary configuration of the tag set 10 etc. according to the second embodiment.

Figure 12:
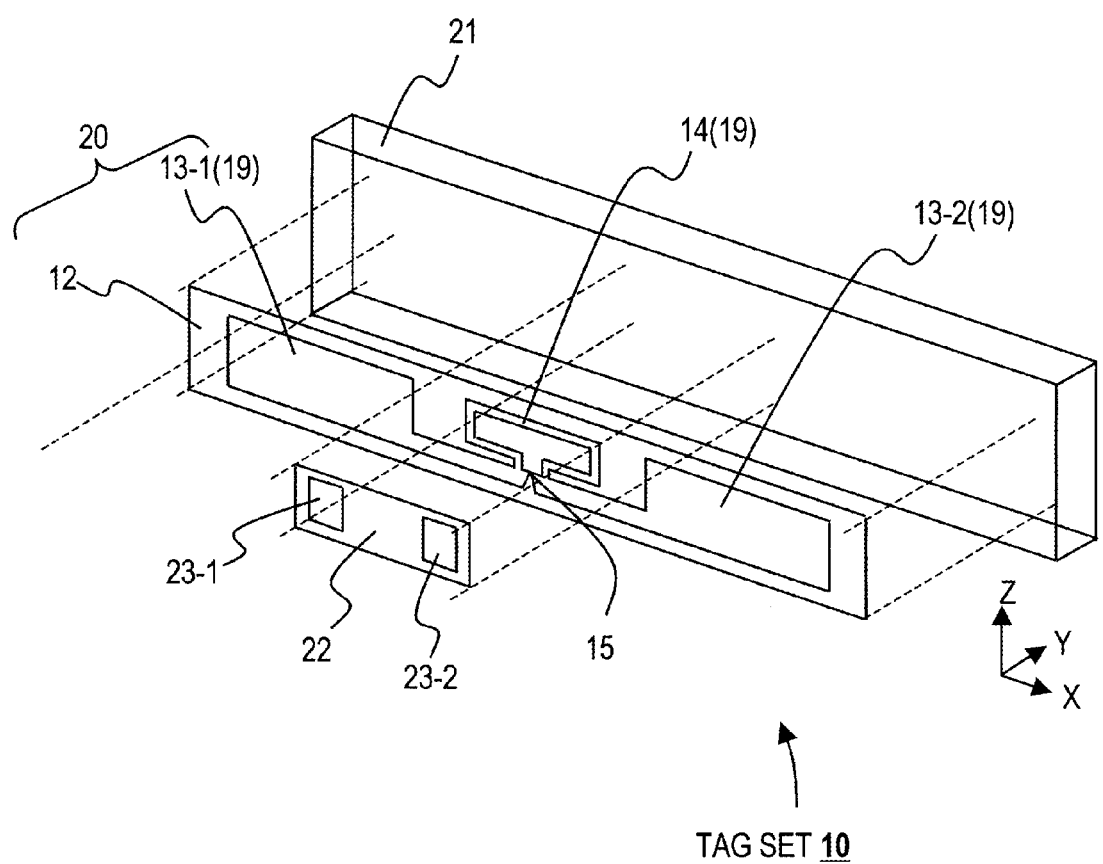
FIG. 12 depicts a diagram illustrating an exemplary configuration of a tag set.
Figure 13:
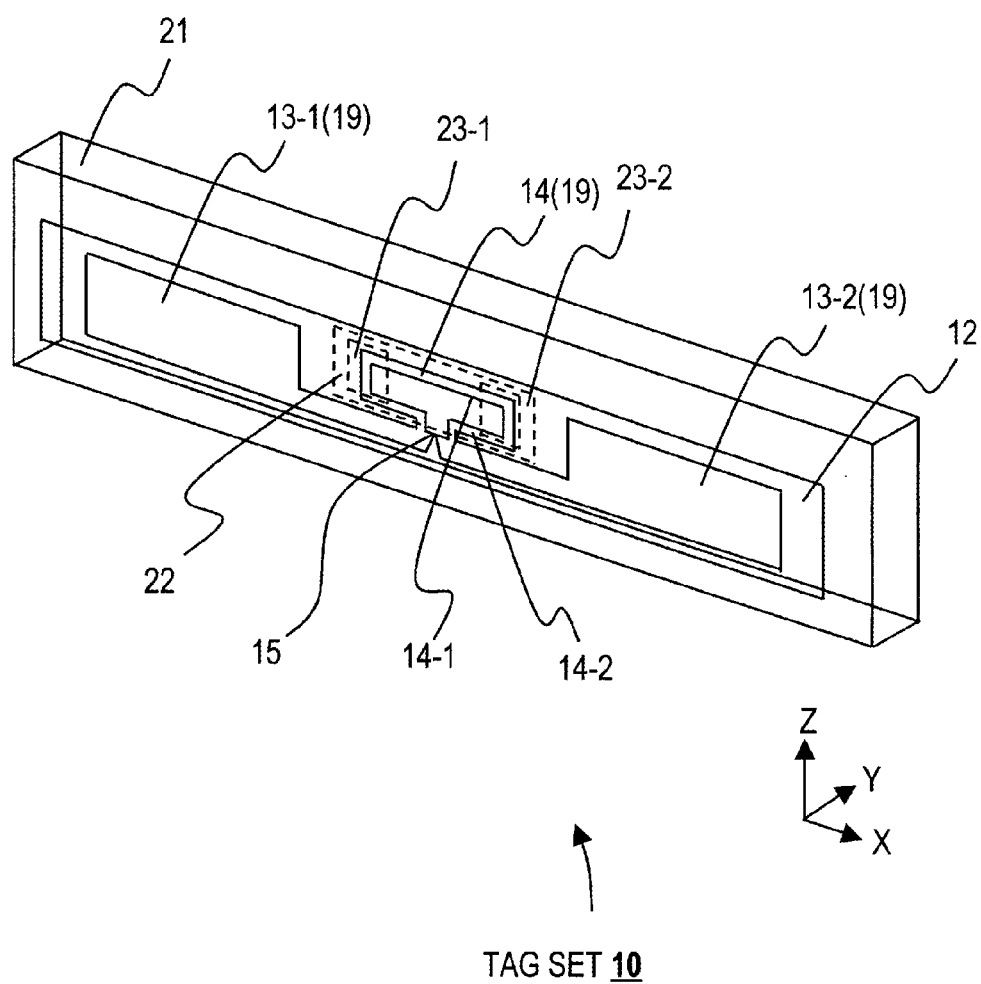
FIG. 13 depicts a diagram illustrating an exemplary configuration of a tag set.
Figure 14:
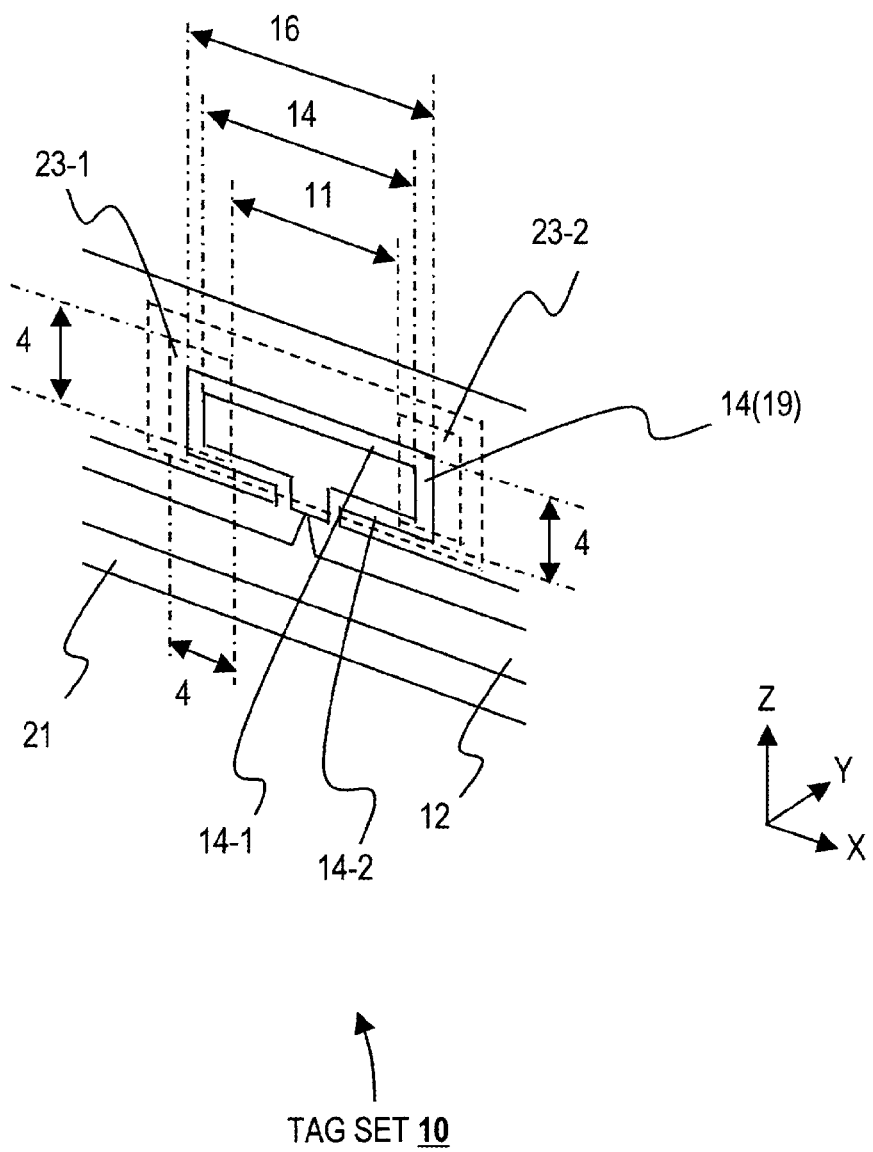
FIG. 14 depicts a diagram illustrating an example of the size of a tag set.
Figure 15A:
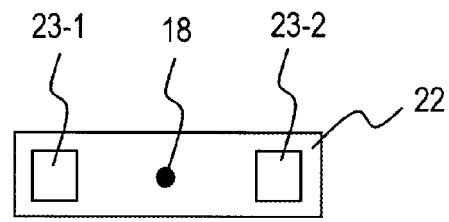
FIG. 15 (A) depicts a diagram illustrating an example of a dummy metal set, and FIG. 15 (B) depicts a diagram illustrating an example of a tag sheet, respectively.
Figure 15B:
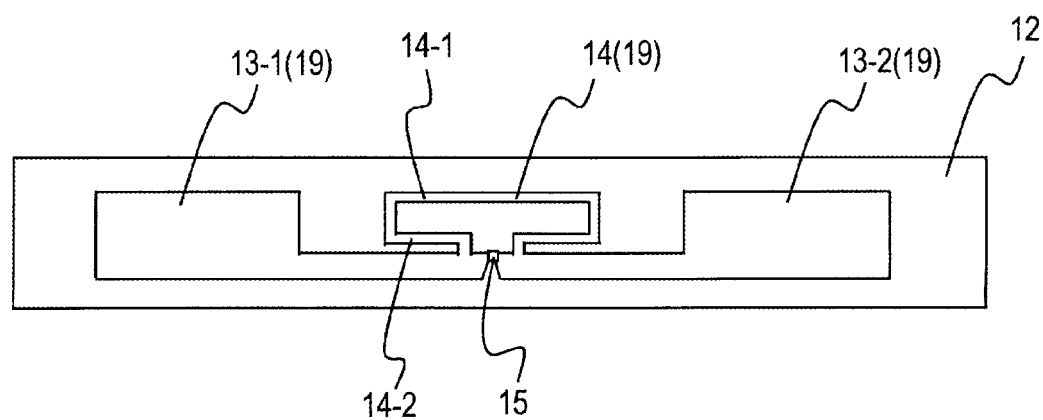
Figure 16:
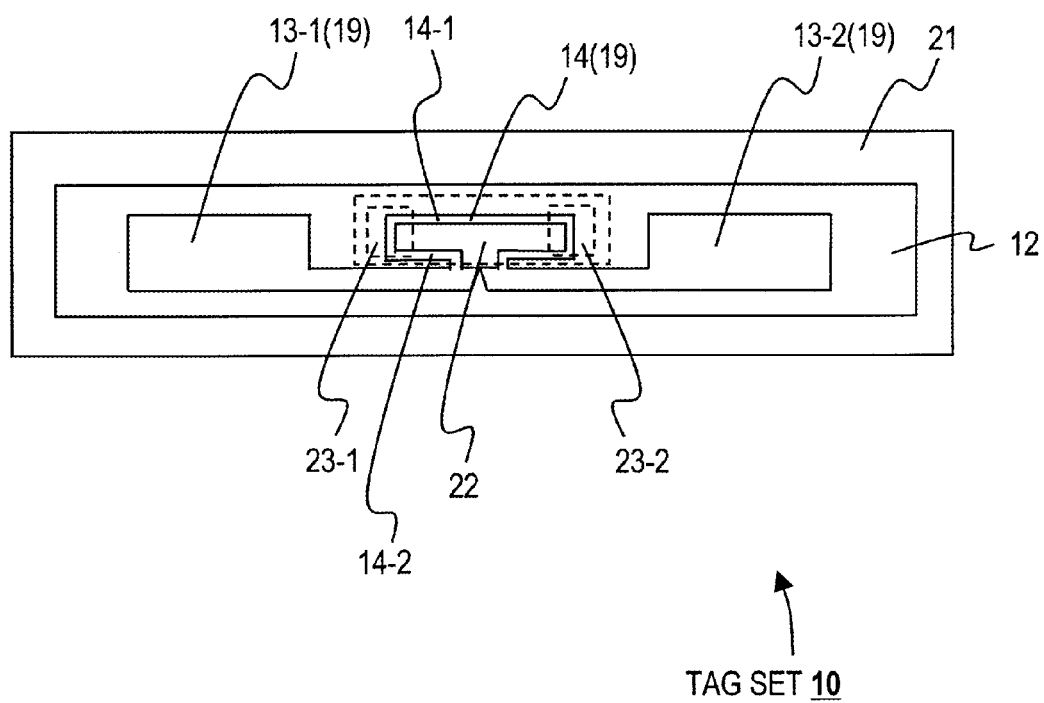
FIG. 16 depicts a diagram illustrating an exemplary configuration of a tag set.

Among these figures, FIG. 12 to FIG. 13 are diagrams illustrating exemplary configurations of the tag set 10, FIG. 14 is a diagram illustrating the size of the tag set 10, and FIG. 15 (A) to FIG. 16 are examples of front elevations of the tag set 10. In the present second embodiment, an affix object 21 is affixed to the tag 20. The affix object 21 is, for example, a dielectric having a dielectric constant ∈r=3 and a thickness t=20 mm.

For example, in regard to the tag 20 (having the same size as the tag 10, for example) having been adjusted to have a maximum communication distance when affixed to an affix object 101 of which dielectric constant ∈r is ∈r=3 and thickness t is t=10 mm, consider a case such that the thickness t is thickened to t=20 mm by the affix object 21, while the dielectric constant ∈r remains to be the same. In this case, as having been described in FIG. 25 for example, a frequency producing the maximum communication distance is shifted from the desired frequency f0 to the low frequency side. In such a case, by shifting the frequency producing the maximum communication distance to the high frequency side, the frequency producing the maximum communication distance may be restored to the desired frequency. To restore to the desired frequency f0, according to the present second embodiment, the dummy metal sheet 22 is affixed to the tag 20 in such a manner that the dummy metal sections 23-1, 23-2 are overlapped with the inductance section 14. Alternatively, the dummy metal sheet 22 is affixed to the tag 20 such that the dummy metal sections 23-1, 23-2 contact through the dummy metal sheet 22 to the inductance section 14.

Similar to the first embodiment, the dummy metal sheet 22 is formed of film, PET, paper, etc., for example. Also, the dummy metal sections 23-1, 23-2 are formed of a metal of which principal component is copper (Cu), silver (Ag) or aluminum (Al), and may be formed by Ag paste, Al vapor deposition, Cu etching, etc.

FIG. 14 is a diagram illustrating an example of the sizes of the principal portions of the tag set 10. The outermost length (or a distance between the tips) of the inductance section 14 in the X-axis direction is 16 mm, the inside length (or a distance between the insides) of the inductance section 14 in the X-axis direction is 14 mm, and a length (width) in the Z-axis direction is 4 mm. Meanwhile, each dummy metal section 23-1, 23-2 has a square shape of which length (X-axis direction) and width (Z-axis direction) are 4 mm, and the inside length (or distance between the insides) of the dummy metal sections 23-1, 23-2 is 11 mm.

Similar to the dummy metal sheet 16 in the first embodiment, the dummy metal sheet 22 includes dummy metal sections 23-1, 23-2 at least one each disposed at each point symmetrical position about the center point 18 of the dummy metal sheet 16, as exemplarily depicted in FIG. 15 (A).

As depicted in FIG. 12 etc., by the affix of the dummy metal sheet 22 to the tag 20 and by the overlap of inductance section 14 with the dummy metal sections 23-1, 23-2, it is possible to restore a frequency producing the maximum communication distance to the desired frequency f0. The reason will be described in the following.

In regard to the tag 20 adjusted based on the assumption of an affix object with a dielectric constant ∈r=3 and a thickness t=10 mm, when the thickness t is thickened to t=20 mm by the affix object 21, a frequency producing the maximum communication distance is shifted from the desired frequency f0 to the low frequency side (for example, FIG. 25). In order to restore the frequency, having been shifted to the low frequency side, to the desired frequency f0, the frequency producing the maximum communication distance may be shifted to the high frequency side.

To shift a frequency f to the high frequency side, a wavelength λ may be shortened by the relational expression of expression (2). In the first embodiment, the wavelength λ is elongated by elongating the current path length. Similarly, the wavelength may be shortened by shortening the current path length. Therefore, by shortening the current path length flowing through the tag antenna 19 (hereafter, such a path is referred to as a "short-circuit path") as compared to the case of no dummy metal sheet 22, it is possible to restore the frequency, having been shifted to the lower frequency side than the desired frequency f0, to the desired frequency f0 on the high frequency side.

Figure 17:
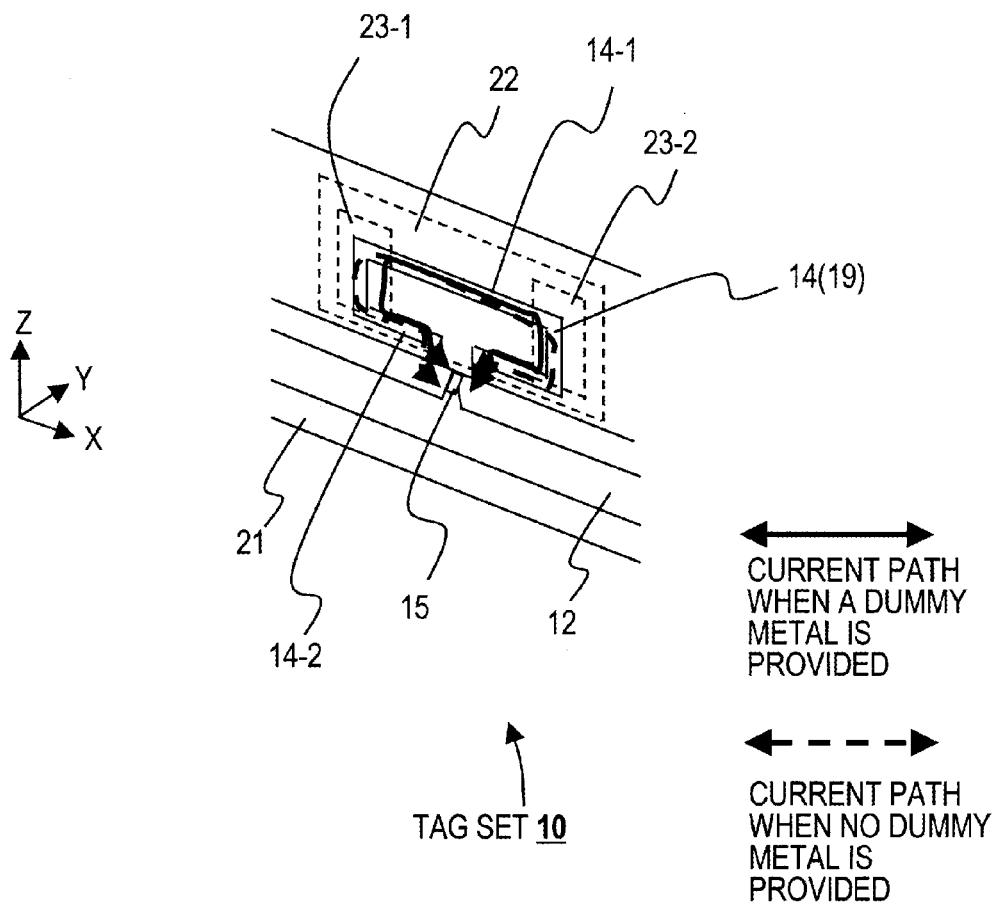
FIG. 17 depicts a diagram illustrating an example of a current path.

FIG. 17 depicts an example of the current path, in which the broken line represents the current path when no dummy metal is provided, and the solid line represents the current path when a dummy metal is provided, respectively. By the affix of the dummy metal sections 23-1, 23-2, a current flowing along the inductance section 14 comes to flow inside the dummy metal sections 23-1, 23-2. By this, when the dummy metal is provided, the current path is shorter than the current path when no dummy metal is provided.

Additionally, when a radio signal is a high frequency signal, the dummy metal sections 23-1, 23-2 may be regarded to be in connection with the inductance section 14, if the dummy metal sheet 22 is disposed between the dummy metal sections 23-1, 23-2 and the inductance section 14.

A graph depicted with the thin solid line in FIG. 7 ("affix dielectric (∈r=3, t=20 mm)+inductance section dummy metal") represents an example of the frequency characteristic in regard to the communication distance of the tag set 10 depicted in FIG. 12 etc. The graph depicted with the thin solid line is obtained by electromagnetic field simulation based on the sizes of the dummy metal sections 23-1, 23-2 as depicted in FIG. 12, for example, similar to the first embodiment. For example, as a result of the simulation, the communication distance is maximized at the desired frequency f0, when an inside distance, a distance between the insides of the dummy metal sections 23-1, 23-2, is 11 mm. The above inside distance of 11 mm between the dummy metal sections 23-1, 23-2 is one example of an optimal length in the case of the affix object 21 of which dielectric constant ∈r is ∈r=3 and thickness t is t=20 mm. The inside distance between the dummy metal sections 23-1, 23-2 may be adjusted in a manner to produce the maximum communication distance at the desired frequency f0, according to the thickness t (or the dielectric constant ∈r) of the affix object 21.

Figure 18:
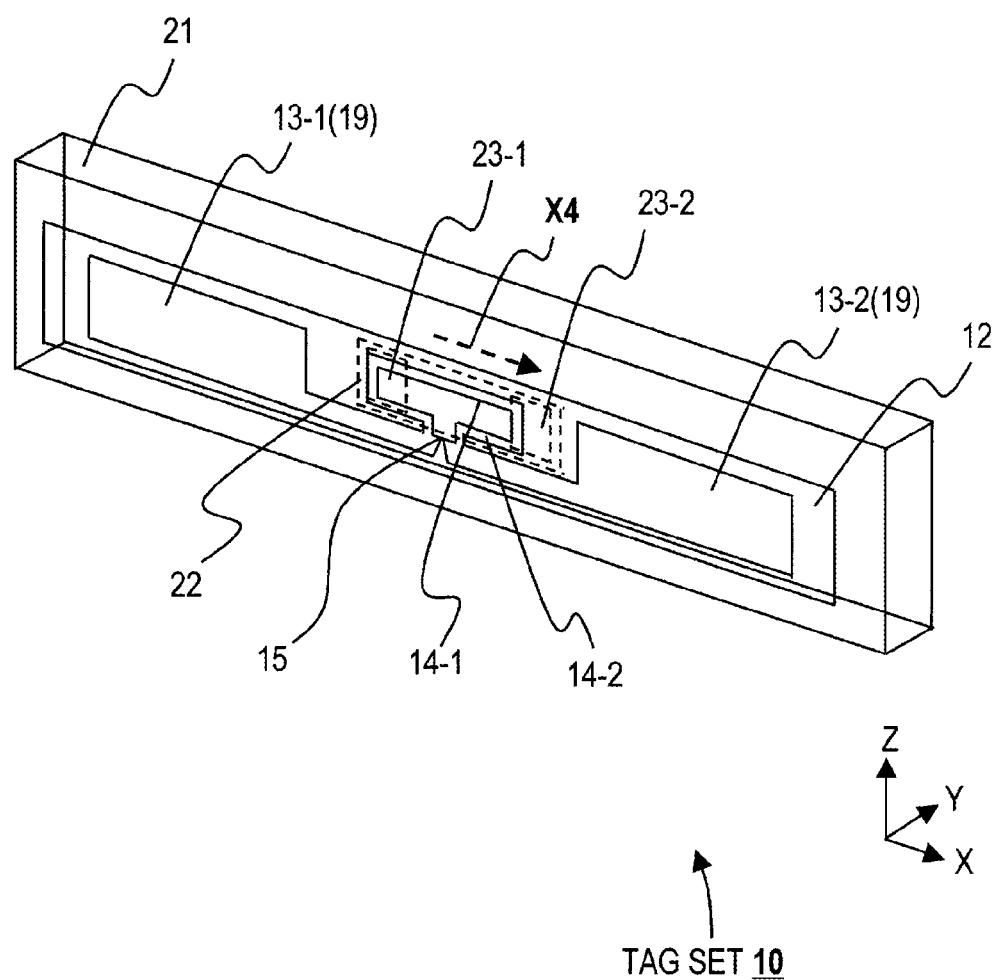
FIG. 18 depicts a diagram illustrating an exemplary configuration of a tag set.

FIG. 18 is a diagram illustrating an exemplary configuration of the tag 10 when the dummy metal sheet 22 is affixed with a deviation to the X4 direction, as compared to the affix position depicted in FIG. 13. The dummy metal sections 23-1, 23-2 may be affixed with a deviation to the X4 direction on condition that the dummy metal sections 23-1, 23-2 are overlapped with the inductance section 14 and the current path length is a short-circuit path and an optimal inside distance (for example, 11 mm) between the dummy metal sections 23-1, 23-2 is maintained, for example. The example depicted in FIG. 18 is a case of the affix with a deviation of 1.5 mm to the X4 direction. The affix may be made with a deviation to the opposite direction.

Here, in FIG. 18, when the dummy metal sections 23-1, 23-2 are not overlapped with the lower side portion 14-2 of the inductance section 14, the current path does not become a short-circuit path, and the current path becomes rather longer than before. Also, when the dummy metal sections 23-1, 23-2 are not overlapped with the upper side portion 14-1, the current path does not become a short-circuit path also.

Figure 19:
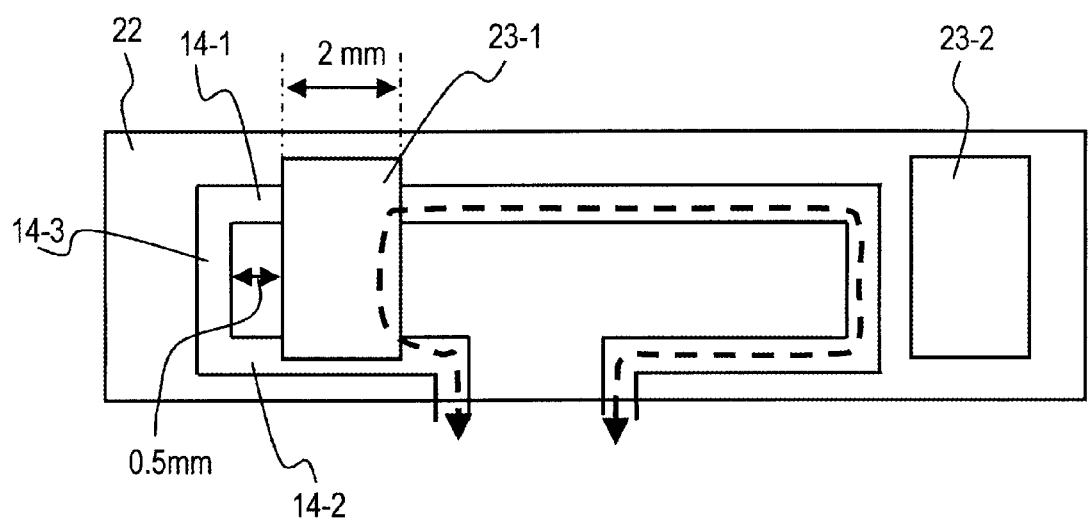
FIG. 19 depicts a diagram illustrating an example of a current path.

Further, as depicted in FIG. 19 for example, in regard to each size of the dummy metal sections 23-1, 23-2, when a length in the X-axis direction is set to be 2 mm and a deviation of 1.5 mm is made to the X4 direction, there may be a case that a gap of 0.5 mm is produced between a connection portion 14-3 of the inductance section 14 and the dummy metal section 23-1. Even in this case, the current flows through the most inside path, and the current path becomes a short-circuit path. Therefore, even in this case, it is possible to obtain substantially the same frequency characteristic of the communication distance as in the aforementioned case.

Additionally, if each length of the dummy metal sections 23-1, 23-2 in the Z-axis direction has a size such that at least the dummy metal sections 23-1, 23-2 overlap with both the upper side portion 14-1 and the lower side portion 14-2 of the inductance section 14, the current path may be formed to be a short-circuit path.

From the above, if the dummy metal sections 23-1, 23-2 overlap with the inductance section 14 and the current path is the short-circuit path, the frequency characteristic in regard to the communication distance may be maintained if there is a deviation to the X-axis direction and/or the Z-axis direction.

Figure 20:
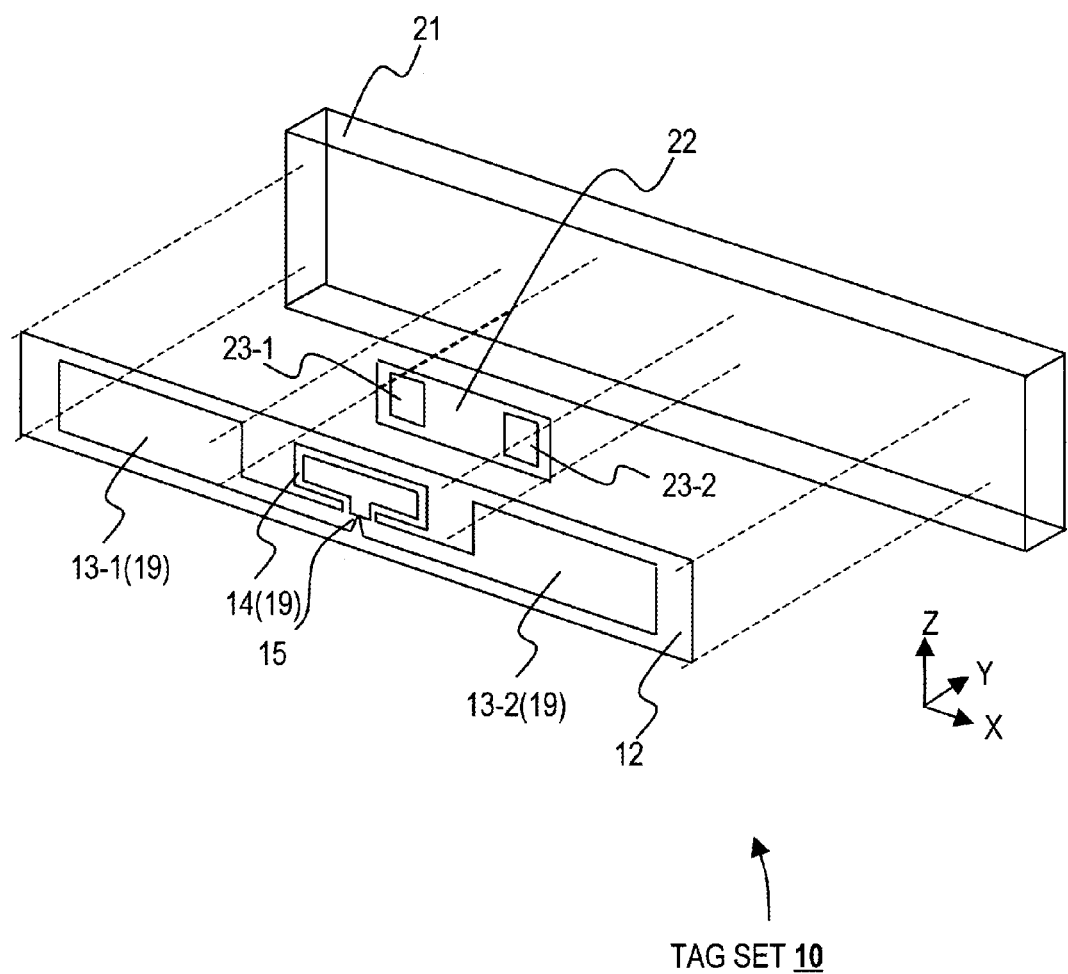
FIG. 20 depicts a diagram illustrating an exemplary configuration of a tag set.

FIG. 20 is a diagram illustrating another exemplary configuration of the tag set 10 according to the present second embodiment. Similar to the first embodiment (FIG. 10, for example), a dummy metal sheet 22 may be disposed between the tag sheet 12 and the affix object 21. In this case also, if the affix position of the dummy metal sheet 22 deviates to the X-axis direction and/or the Z-axis direction, the communication distance may be maximized at the desired frequency f0. In regard to the tag set 10 depicted in FIG. 20, the whole body may be laminated with a film, PET and another film such as paper.

Figure 21A:
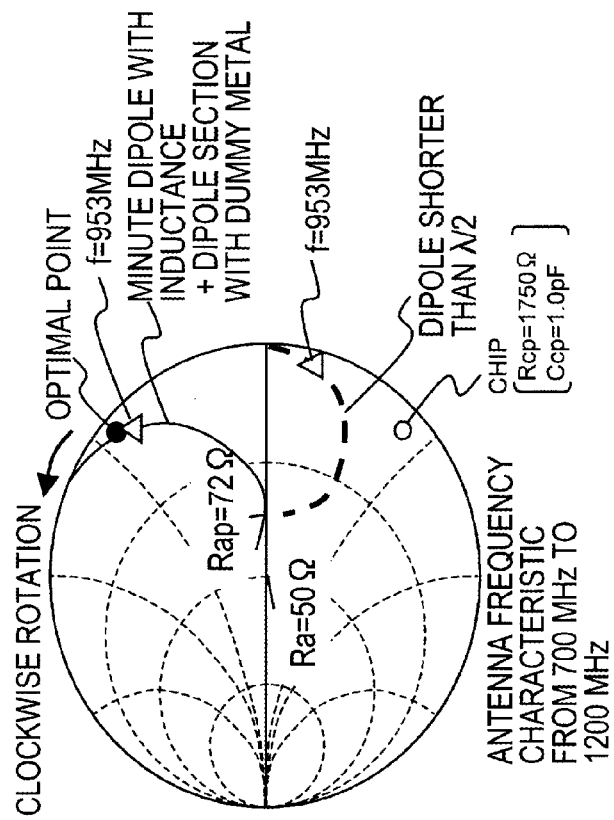
FIG. 21 (A) and FIG. 21 (B) depict diagrams respectively illustrating examples of admittance charts.
Figure 21B:
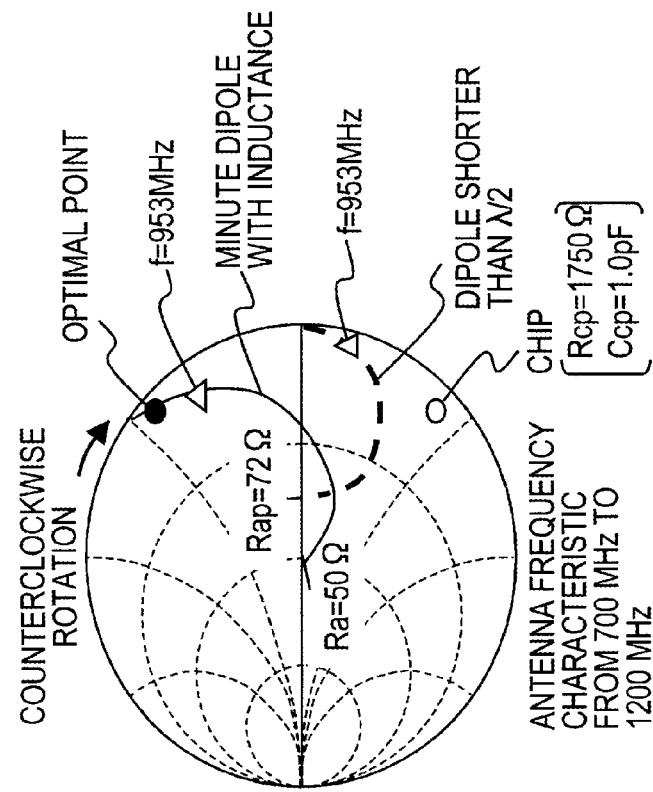

FIGS. 21 (A) and (B) depict examples of admittance charts according to the second embodiment. In the figures, FIG. 21 (A) depicts an example of the admittance chart when the thickness t of the affix object 101 to the tag 20 (having the same size as the tag 100 depicted in FIG. 22, for example) is modified from 10 mm to 20 mm. Also, FIG. 21 (B) depicts an example of the admittance chart of the tag set 10 in which the dummy metal sheet 22 is affixed to the tag 20. Similar to the first embodiment, both charts are obtained by performing electromagnetic field simulation and plotting on each admittance chart the calculation results obtained when a current frequency is changed from 700 MHz to 120 MHz, using the chip 15 as a feeding point.

The solid line depicted in FIG. 21 (A) represents a locus ("minute dipole with inductance") when the inductance section 14 is connected in parallel to the dipole sections 13-1, 13-2, and the affix object 21 (dielectric constant ∈r=3 and thickness t=2 mm) is affixed. As compared to FIG. 24, a point (triangle) at f=953 MHz is rotated clockwise. The reason is that, in proportion as the affix object thickness t is thickened from t=10 mm to t=20 mm, a portion having dielectric constant ∈r=3 is enlarged and a portion having ∈r=1, the dielectric constant of air, is reduced, and accordingly, an effective dielectric constant in the periphery of the tag antenna 19 becomes relatively high. When the desired frequency f0 is set to be f0=953 MHz, the position of the desired frequency f0 on the admittance chart is located at a position deviating from the optimal point, as depicted in FIG. 21 (A).

On the other hand, the solid line depicted in FIG. 21 (B) represents a locus ("minute dipole with inductance+dummy metal sheet") when the inductance section 14 is connected in parallel to the dipole sections 13-1, 13-2 and the affix object 11 is affixed to the tag 20, and further, the dummy metal sheet 22 is affixed to the tag 20.

As depicted with the solid line in FIG. 21 (B), when the dummy metal sheet 22 is affixed to the tag 20, the locus when the dummy metal sheet is affixed is rotated counterclockwise as a whole, in comparison with the locus (FIG. 21 (A)) when the dummy metal sheet 22 is not affixed. By the counterclockwise rotation as a whole, an overlap with the optimal point at the desired frequency f0=953 MHz is achieved. By the affix of the dummy metal sheet 22 to the tag 20, the tag antenna 19 resonates at the desired frequency f0, so that sufficient power may be supplied from the dipole sections 13-1, 13-2 to the chip 15. Further, as also depicted with the aforementioned thin solid line depicted in FIG. 7, the communication distance of the tag set 10 becomes maximal at the desired frequency f0.

Additionally, by the electromagnetic field simulation, the communication distance becomes maximal when the outermost distance of the dipole sections 13-1, 13-2 is smaller than one half of the resonance wavelength λ1 (i.e. λ½).

In regard to the locus depicted with the solid line in FIG. 21 (B), in comparison with FIG. 10 (B) according to the first embodiment, the locus of the bold line in FIG. 10 (B) draws the same locus as the bold line in FIG. 10 (A), and produces an optimal point at f0=953 MHz. The locus of the solid line in FIG. 21 (B) is such that a point of f0=953 MHz moves to the optimal point by the counterclockwise rotation of the overall locus in FIG. 21 (A), which is different from the case of the first embodiment in a point that the overall locus of the solid line in FIG. 21 (A) is rotated counterclockwise.

In the aforementioned second embodiment, the description is given on the example when the thickness t of the affix object is thickened from 10 mm to 20 mm without change of the dielectric constant ∈r. It is also possible to obtain a similar embedment when the dielectric constant ∈r of the affix object is increased from ∈r2 to ∈r1 (∈r2<∈r1), without change of the thickness t of the affix object.

Figure 23:
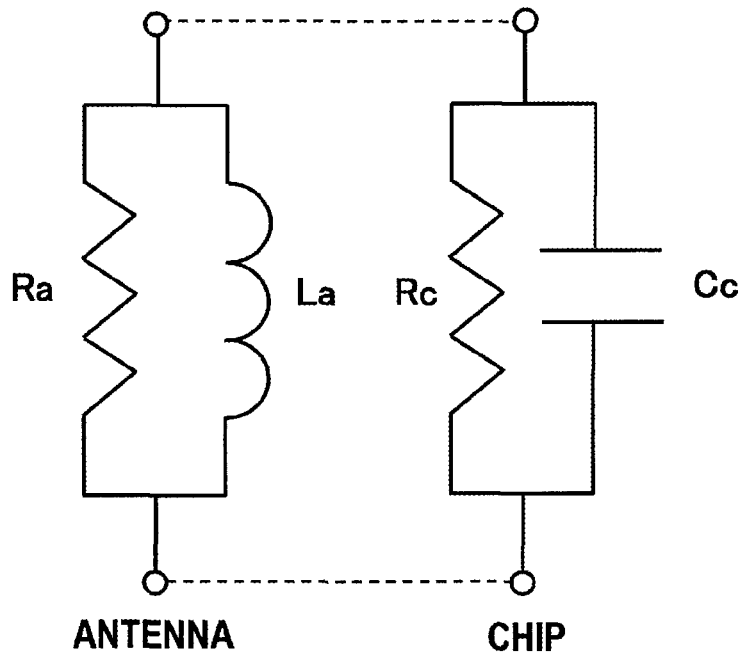
FIG. 23 depicts a diagram illustrating an example of an equivalent circuit of a tag antenna.

If the dielectric constant ∈r is increased from ∈r2 to ∈r1, effective dielectric constant in the periphery of the tag antenna 19 becomes larger in proportion as the dielectric constant is increased, similar to the case that the thickness t of the affix object is thickened. Therefore, in the case of the dielectric constant ∈r increased from ∈r2 to ∈r1 without change of the thickness t of the affix object, a graph that represents the relationship of the communication distance to the frequency may be depicted with the solid line in FIG. 23, for example, similarly to when the thickness t is thickened. In this case, a frequency f producing the maximum communication distance is shifted to the lower frequency side than the desired frequency f0. Thus, by the affix of the dummy metal sheet 16 to the tag 20 in a similar manner to the aforementioned example, a frequency producing the maximum communication distance may be restored to the desired frequency f0.

As having been described above, according to the present embodiment, in regard to a tag 20 optimized to obtain the maximum communication distance with a certain dielectric constant ∈r and a certain thickness t at the desired frequency f0, the dummy metal sheet 16 is affixed to the tag 20 when operating the tag 20 that is affixed to a dielectric having a different dielectric constant ∈r and a different thickness t. By this, the communication distance may be maximized at the desired frequency.

Further, in regard to the affix of the dummy metal sheet 16, if the dummy metal sections 23-1, 23-2 form a current path to be a short-circuit path, it is possible to maintain the frequency characteristic of the communication distance if there is a deviation to the X-axis direction and/or the Z-axis direction. Thus, with an allowance to the deviation, position adjustment becomes easier as compared to a case when the position adjustment of the dummy metal sheet 22 is to be carried out precisely on the basis of 1 mm.

Other Embodiments

In both the aforementioned first and second embodiments, descriptions is given on the examples of affixing to the tag 20 the dummy metal sheets 16, 22 that include the dummy metal sections 17-1, 17-2, 23-1, 23-2. It is also possible to make a frequency producing the maximum communication distance deviating to the high frequency side or the low frequency side by for example, affixing each dummy metal sheet 16, 22 to the tag 20 in advance, and by exfoliating the dummy metal sheet 20 from the tag 20. For example, if the dummy metal sheet 16 is exfoliated from the state depicted in FIG. 2, it is possible to shift a frequency producing the maximum communication distance to the higher frequency side than the desired frequency f0. Also, if the dummy metal sheet 22 is exfoliated from the state depicted in FIG. 13, it is possible to shift a frequency producing the maximum communication distance to the lower frequency side than the desired frequency f0.

Further, in the first and second embodiments, descriptions is given on the provision of the dummy metal sections 17-1, 17-2, 23-1, 23-2, one on the right and one on the left, respectively about the respective center points 18 of the dummy metal sheets 16, 22. Each dummy metal sheet 16, 22 may include two or more dummy metal sections 17-1, 17-2, 23-1, 23-2 on the right and on the left, respectively, or may include a mutually different number of dummy metal sections 17-1, 17-2, 23-1, 23-2 on the right and left. In regard to the dummy metal sheet 16 according to the first embodiment, two or more dummy metal sections 17-1, 17-2 may be provided on the right and left, respectively, if the outermost distance between the dummy metal sections 17-1, 17-2 is maintained to be a distance that is adjusted according to the dielectric constant ∈r and the thickness t of the dielectric. Also, in regard to the dummy metal sheet 22 according to the second embodiment, two or more dummy metal sections 23-1, 23-2 may be provided on the right and left, respectively, if the distance between inside the dummy metal sections 23-1, 23-2 is maintained to be a distance adjusted according to the dielectric constant ∈r and the thickness t of the dielectric. Further, in regard to each shape of the dummy metal sections 17-1, 17-2, 23-1, 23-2, in addition to the rectangular shape, a circular shape, a triangular shape and a complicated shape in combination thereof may be applicable.

Thus, in regard to the tag 20 adjusted to obtain the maximum communication distance with a certain dielectric constant ∈r and a certain thickness, the tag 20 is configured to enable affixing each dummy metal sheet 16, 22 when the tag 20 is operated by being affixed to a dielectric having a different dielectric constant ∈r and a different thickness t. Each dummy metal sheet 16, 22 includes dummy metal sections 17-1, 17-2, 23-1, 23-2, at least one each disposed at each point symmetrical position about the center point 18 of the dummy metal sheet 16, 22. Each dummy metal sheet 16, 22 is affixed to the tag 20 in such a manner that each portion of the dummy metal sections 17-1, 17-2, 23-1, 23-2 is overlapped with the tag 20. By this, it is possible to restore a frequency producing the maximum communication distance to the desired frequency f0 before adjustment. Further, if there is an error in the affix of the dummy metal sheets 16, 22 to the tag 20, it is possible to adjust to maximize the communication distance at the desired frequency f0.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it should be understood that the various changes, substitutions, and alterations could be made hereto without departing from the spirit and scope of the invention.

What is claimed is:

1. A metal sheet comprising:
   a first and second metal sections disposed at point symmetrical positions about a center point of the metal sheet, wherein
   each portion of the first and second metal sections is affixed to a tag so as to contact to outermost tip on a first axis of a first and second dipole antennas or inner portion in the first axis of an inductance section disposed on the tag which performs non-contact communication.

2. The metal sheet according to claim 1, wherein
   a current path length relative to the first and second dipole antennas disposed on the tag is longer than when the metal sheet is not affixed to the tag, when the metal sheet is affixed to the tag.

3. The metal sheet according to claim 1, wherein
   the first and the second metal sections contact to the inductance section disposed on the tag, and a current path length of the inductance section is shorter than when the metal sheet is not affixed to the tag, when the metal sheet is affixed to the tag.

4. The metal sheet according to claim 3, wherein
   a distance between the first and second metal sections is adjusted in a manner that a communication distance becomes maximal at a first frequency when a communication distance becomes maximal at the first frequency in a state that a first dielectric, including a first dielectric constant and a first thickness in a second axis direction, is affixed to the tag, and when the metal sheet is affixed to the tag in a state that a third dielectric, including a third dielectric constant greater than the first dielectric constant or a third thickness thicker than the first thickness in the second axis direction, is affixed to the tag.

5. The metal sheet according to claim 1, wherein
   a current path length relative to the inductance section disposed on the tag is shorter than when the metal sheet is not affixed to the tag, when the metal sheet is affixed to the tag.

6. A metal sheet comprising:
a first and second metal sections disposed at point symmetrical positions about a center point of the metal sheet, wherein
each portion of the first and second metal sections is affixed to a tag so as to contact to the tag which performs non-contact communication,
the first and second metal sections contact to outermost tip portions in a first axis direction of a first and second dipole antennas disposed on the tag respectively, when the metal sheet is affixed to the tag, and
a distance between outermost sides of the first and second metal sections in the first axis direction is longer than a distance between tip portions of the first and second dipole antennas in the first axis direction.

7. The metal sheet according to claim 6, wherein
by letting L1 be a length of a contact portion when the first or the second metal section contacts to the tip portion of the first or the second dipole antenna respectively, and L2 be an allowance of an affix error to the first axis direction when the metal sheet is affixed to the tag, and L4 be a length of the first or the second dipole antenna in the first axis direction, a relation of $L2<L1<(L4-L2)$ is satisfied respectively.

8. The metal sheet according to claim 6, wherein
a distance between the first and second metal sections is adjusted in a manner that a communication distance becomes maximal at a first frequency, when a communication distance of the tag becomes maximal at the first frequency in a state that a first dielectric, including a first dielectric constant and a first thickness in a second axis direction, is affixed to the tag, and when the metal sheet is affixed to the tag in a state that a second dielectric, including a second dielectric constant smaller than the first dielectric constant or a second thickness thinner than the first thickness in the second axis direction, is affixed to the tag.

9. A tag set comprising:
a dielectric;
a tag which is affixed to the dielectric and performs non-contact communication; and
a metal sheet, wherein
the metal sheet includes a first and second metal sections respectively disposed at point symmetrical positions about a center point of the metal sheet, and
the metal sheet is affixed to the tag so that each portion of the first and second metal sections contact to outermost tip on a first axis of a first and second dipole antennas or inner portion in the first axis of an inductance section disposed on the tag.

10. The tag set according to claim 9, wherein
the first and second metal sections contact to outermost tip portions of the first and second dipole antennas disposed on the tag in the first axis direction respectively, when the metal sheet is affixed to the tag, and
a distance between outermost sides of the first and second metal sections in the first axis direction is longer than a distance between outermost sides of the first and second dipole antennas in the first axis direction.

11. The tag set according to claim 9, wherein
the first and second metal sections contact to the inductance section disposed on the tag when the metal sheet is affixed to the tag, and
a current path length of the inductance section is shorter than when the metal sheet is not affixed to the tag.

12. The tag set according to claim 11, wherein
a length of the dipole antenna in the first axis direction is shorter than one half of a resonance frequency of the first and second dipole antennas.

* * * * *